(12) United States Patent
Fanelli et al.

(10) Patent No.: US 10,810,605 B2
(45) Date of Patent: Oct. 20, 2020

(54) SYSTEM, METHOD, SOFTWARE AND DATA STRUCTURE FOR INDEPENDENT PREDICTION OF ATTITUDINAL AND MESSAGE RESPONSIVENESS, AND PREFERENCES FOR COMMUNICATION MEDIA, CHANNEL, TIMING, FREQUENCY, AND SEQUENCES OF COMMUNICATIONS, USING AN INTEGRATED DATA REPOSITORY

(71) Applicant: Experian Marketing Solutions, LLC, Schaumburg, IL (US)

(72) Inventors: Marc Christian Fanelli, Kinnelon, NJ (US); Patricia Kay Gormley, Lincoln, NE (US); Kymberly Ann Kulle, Cincinnati, OH (US); Thomas G. Nocerino, Bethlehem, PA (US); Kaushik Sanyal, Jersey City, NJ (US)

(73) Assignee: Experian Marketing Solutions, LLC, Schaumburg, IL (US)

( * ) Notice: Subject to any disclaimer, the term of this patent is extended or adjusted under 35 U.S.C. 154(b) by 0 days.

(21) Appl. No.: 15/791,331

(22) Filed: Oct. 23, 2017

(65) Prior Publication Data

US 2018/0121940 A1    May 3, 2018

Related U.S. Application Data

(63) Continuation of application No. 15/621,142, filed on Jun. 13, 2017, now abandoned, which is a
(Continued)

(51) Int. Cl.
*G06Q 30/00* (2012.01)
*G06Q 30/02* (2012.01)

(52) U.S. Cl.
CPC ......... *G06Q 30/0202* (2013.01); *G06Q 30/02* (2013.01); *G06Q 30/0203* (2013.01); *G06Q 30/0204* (2013.01)

(58) Field of Classification Search
None
See application file for complete search history.

(56) References Cited

U.S. PATENT DOCUMENTS 4,775,935 A    10/1988 Yourick
4,982,346 A    1/1991 Girouard et al.
(Continued)

FOREIGN PATENT DOCUMENTS

| CN | 1290372 | 5/2001 |
| DE | 91 08 341 | 10/1991 |

(Continued)

OTHER PUBLICATIONS

U.S. Appl. No. 12/705,489, filed Feb. 12, 2010 Bargoli et al.
(Continued)

*Primary Examiner* — Gurkanwaljit Singh
(74) *Attorney, Agent, or Firm* — Knobbe, Martens, Olson & Bear, LLP

(57) ABSTRACT

The present invention provides a system, method, software and data structure for independently predicting attitudinal and message responsiveness, using a plurality of attitudinal or other identification classifications and a plurality of message content or version classifications, for a selected population of a plurality of entities, such as individuals or households, represented in a data repository. The plurality of predictive attitudinal (or identification) classifications and plurality of predictive message content (ore version) classifications have been determined using a plurality of predictive models developed from a sample population and applied to a reference population represented in the data repository,
(Continued)

such as attitudinal, behavioral, or demographic models. For each predictive attitudinal (or identification) classification, at least one predominant predictive message content or version classification is independently determined. The exemplary embodiments also provide, for each predictive attitudinal classification, corresponding information concerning predominant communication media (or channel) types, predominant communication timing, predominant communication frequency, and predominant communication sequencing.

10 Claims, 7 Drawing Sheets

Related U.S. Application Data continuation of application No. 15/292,861, filed on Oct. 13, 2016, now abandoned, which is a continuation of application No. 13/689,425, filed on Nov. 29, 2012, now Pat. No. 9,471,928, which is a continuation of application No. 10/881,436, filed on Jun. 30, 2004, now Pat. No. 8,346,593.

(56) References Cited

U.S. PATENT DOCUMENTS

| | | | |
|---|---|---|---|
| 5,201,010 | A | 4/1993 | Deaton et al. |
| 5,274,547 | A | 12/1993 | Zoffel et al. |
| 5,283,731 | A | 2/1994 | Lalonde et al. |
| 5,305,195 | A | 4/1994 | Murphy |
| 5,325,509 | A | 6/1994 | Lautzenheiser |
| 5,347,632 | A | 9/1994 | Filepp et al. |
| 5,454,030 | A | 9/1995 | de Oliveira et al. |
| 5,459,306 | A | 10/1995 | Stein et al. |
| 5,504,675 | A | 4/1996 | Cragun et al. |
| 5,515,098 | A | 5/1996 | Caries |
| 5,560,008 | A | 9/1996 | Johnson et al. |
| 5,563,783 | A | 10/1996 | Stolfo et al. |
| 5,592,560 | A | 1/1997 | Deaton et al. |
| 5,627,973 | A | 5/1997 | Armstrong et al. |
| 5,629,982 | A | 5/1997 | Micali |
| 5,630,127 | A | 5/1997 | Moore et al. |
| 5,649,114 | A | 7/1997 | Deaton et al. |
| 5,661,516 | A | 8/1997 | Caries |
| 5,689,565 | A | 11/1997 | Spies et al. |
| 5,696,898 | A | 12/1997 | Baker et al. |
| 5,696,907 | A | 12/1997 | Tom |
| 5,717,923 | A | 2/1998 | Dedrick |
| 5,724,521 | A | 3/1998 | Dedrick |
| 5,740,549 | A | 4/1998 | Reilly et al. |
| 5,745,654 | A | 4/1998 | Titan |
| 5,745,694 | A | 4/1998 | Egawa et al. |
| 5,774,357 | A | 6/1998 | Hoffberg et al. |
| 5,774,868 | A | 6/1998 | Cragun et al. |
| 5,774,870 | A | 6/1998 | Storey |
| 5,819,092 | A | 10/1998 | Ferguson et al. |
| 5,819,226 | A | 10/1998 | Gopinathan et al. |
| 5,825,884 | A | 10/1998 | Zdepski et al. |
| 5,828,837 | A | 10/1998 | Eikland |
| 5,848,396 | A | 12/1998 | Gerace |
| 5,857,175 | A | 1/1999 | Day et al. |
| 5,864,822 | A | 1/1999 | Baker, III |
| 5,870,721 | A | 2/1999 | Norris |
| 5,873,068 | A | 2/1999 | Beaumont et al. |
| 5,889,799 | A | 3/1999 | Grossman et al. |
| 5,889,958 | A | 3/1999 | Willens |
| 5,890,140 | A * | 3/1999 | Clark .................. G06Q 20/10 705/35 |
| 5,907,608 | A | 5/1999 | Shaffer et al. |
| 5,907,830 | A | 5/1999 | Engel et al. |
| 5,912,839 | A | 6/1999 | Ovshinsky et al. |
| 5,915,243 | A | 6/1999 | Smolen |
| 5,924,082 | A | 7/1999 | Silverman et al. |
| 5,930,764 | A * | 7/1999 | Melchione ............ G06Q 30/02 705/7.29 |
| 5,930,776 | A | 7/1999 | Dykstra et al. |
| 5,933,813 | A | 8/1999 | Teicher et al. |
| 5,944,790 | A | 8/1999 | Levy |
| 5,948,061 | A | 9/1999 | Merriman et al. |
| 5,953,707 | A | 9/1999 | Huang et al. |
| 5,966,695 | A | 10/1999 | Melchione et al. |
| 5,974,396 | A | 10/1999 | Anderson et al. |
| 5,991,735 | A | 11/1999 | Gerace |
| 6,014,688 | A | 1/2000 | Venkatraman et al. |
| 6,026,368 | A | 2/2000 | Brown et al. |
| 6,029,139 | A | 2/2000 | Cunningham et al. |
| 6,044,357 | A | 3/2000 | Garg |
| 6,055,573 | A * | 4/2000 | Gardenswartz ........ G06Q 30/02 709/219 |
| 6,061,658 | A | 5/2000 | Chou et al. |
| 6,061,691 | A | 5/2000 | Fox |
| 6,064,973 | A | 5/2000 | Smith et al. |
| 6,070,142 | A | 5/2000 | McDonough et al. |
| 6,070,147 | A | 5/2000 | Harms et al. |
| 6,073,241 | A | 6/2000 | Rosenberg et al. |
| 6,078,892 | A | 6/2000 | Anderson et al. |
| 6,085,169 | A | 7/2000 | Walker et al. |
| 6,101,486 | A | 8/2000 | Roberts et al. |
| 6,115,693 | A | 9/2000 | McDonough et al. |
| 6,144,948 | A | 11/2000 | Walker et al. |
| 6,178,442 | B1 | 1/2001 | Yamazaki |
| 6,202,053 | B1 | 3/2001 | Christiansen et al. |
| 6,208,979 | B1 | 3/2001 | Sinclair |
| 6,209,033 | B1 | 3/2001 | Datta et al. |
| 6,233,566 | B1 | 5/2001 | Levine et al. |
| 6,236,977 | B1 | 5/2001 | Verba et al. |
| 6,269,343 | B1 | 7/2001 | Pallakoff |
| 6,289,318 | B1 | 9/2001 | Barber |
| 6,298,330 | B1 * | 10/2001 | Gardenswartz ........ G06Q 30/02 705/14.25 |
| 6,308,210 | B1 | 10/2001 | Fields et al. |
| 6,317,752 | B1 | 11/2001 | Lee et al. |
| 6,324,566 | B1 | 11/2001 | Himmel et al. |
| 6,330,546 | B1 | 12/2001 | Gopinathan et al. |
| 6,334,110 | B1 | 12/2001 | Walter et al. |
| 6,385,592 | B1 | 5/2002 | Angles et al. |
| 6,385,594 | B1 | 5/2002 | Lebda et al. |
| 6,412,012 | B1 | 6/2002 | Bieganski et al. |
| 6,424,956 | B1 | 7/2002 | Werbos |
| 6,442,577 | B1 | 8/2002 | Britton et al. |
| 6,445,975 | B1 | 9/2002 | Ramsey |
| 6,460,036 | B1 | 10/2002 | Herz |
| 6,477,509 | B1 | 11/2002 | Hammons et al. |
| 6,505,168 | B1 | 1/2003 | Rothman et al. |
| 6,513,018 | B1 | 1/2003 | Culhane |
| 6,546,257 | B1 | 4/2003 | Stewart et al. |
| 6,549,944 | B1 | 4/2003 | Weinberg et al. |
| 6,604,089 | B1 | 8/2003 | Van Horn et al. |
| 6,606,744 | B1 | 8/2003 | Mikurak |
| 6,611,816 | B2 | 8/2003 | Lebda et al. |
| 6,615,247 | B1 | 9/2003 | Murphy |
| 6,623,529 | B1 | 9/2003 | Lakritz |
| 6,631,356 | B1 | 10/2003 | Van Horn et al. |
| 6,640,215 | B1 | 10/2003 | Galperin et al. |
| 6,665,715 | B1 | 12/2003 | Houri |
| 6,671,818 | B1 | 12/2003 | Mikurak |
| 6,698,020 | B1 | 2/2004 | Zigmond et al. |
| 6,748,426 | B1 | 6/2004 | Shaffer et al. |
| 6,757,740 | B1 | 6/2004 | Parekh et al. |
| 6,801,909 | B2 | 10/2004 | Delgado et al. |
| 6,810,356 | B1 | 10/2004 | Garcia-Franco et al. |
| 6,873,979 | B2 | 3/2005 | Fishman et al. |
| 6,901,406 | B2 | 5/2005 | Nabe et al. |
| 6,915,269 | B1 | 7/2005 | Shapiro et al. |
| 6,925,441 | B1 | 8/2005 | Jones, III et al. |
| 6,959,281 | B1 | 10/2005 | Freeling et al. |
| 6,970,830 | B1 | 11/2005 | Samra et al. |
| 6,983,478 | B1 | 1/2006 | Grauch et al. |
| 6,993,493 | B1 | 1/2006 | Galperin et al. |
| 7,003,792 | B1 | 2/2006 | Yuen |

(56) References Cited

U.S. PATENT DOCUMENTS

| | | | |
|---|---|---|---|
| 7,013,285 B1* | 3/2006 | Rebane | G06Q 30/02 705/7.31 |
| 7,023,980 B2 | 4/2006 | Lenard | |
| 7,031,945 B1 | 4/2006 | Donner | |
| 7,033,792 B2 | 4/2006 | Zhong et al. | |
| 7,039,607 B2 | 5/2006 | Watarai et al. | |
| 7,047,251 B2 | 5/2006 | Reed et al. | |
| 7,050,989 B1 | 5/2006 | Hurt et al. | |
| 7,054,828 B2 | 5/2006 | Heching et al. | |
| 7,072,853 B2 | 7/2006 | Shkedi | |
| 7,072,963 B2 | 7/2006 | Anderson et al. | |
| 7,080,027 B2* | 7/2006 | Luby | G06Q 10/06 705/7.31 |
| 7,085,734 B2 | 8/2006 | Grant et al. | |
| 7,117,172 B1 | 10/2006 | Black | |
| 7,136,448 B1 | 11/2006 | Venkaperumal et al. | |
| 7,150,030 B1 | 12/2006 | Eldering et al. | |
| 7,152,018 B2 | 12/2006 | Wicks | |
| 7,152,237 B2 | 12/2006 | Flickinger et al. | |
| 7,155,508 B2 | 12/2006 | Sankuratripati et al. | |
| 7,165,037 B2* | 1/2007 | Lazarus | G06Q 30/02 705/7.31 |
| 7,185,353 B2 | 2/2007 | Schlack | |
| 7,191,144 B2 | 3/2007 | White | |
| 7,194,420 B2 | 3/2007 | Ikezawa et al. | |
| 7,212,979 B1* | 5/2007 | Matz | G06Q 30/02 348/E7.071 |
| 7,240,059 B2 | 7/2007 | Bayliss et al. | |
| 7,249,048 B1 | 7/2007 | O'Flaherty | |
| 7,275,083 B1 | 9/2007 | Seibel et al. | |
| 7,296,734 B2 | 11/2007 | Pliha | |
| 7,305,364 B2 | 12/2007 | Nabe et al. | |
| 7,308,418 B2 | 12/2007 | Malek et al. | |
| 7,310,617 B1 | 12/2007 | Cunningham | |
| 7,313,538 B2 | 12/2007 | Wilmes et al. | |
| 7,313,622 B2 | 12/2007 | Lee et al. | |
| 7,314,166 B2 | 1/2008 | Anderson et al. | |
| 7,328,169 B2 | 2/2008 | Temares et al. | |
| 7,366,694 B2 | 4/2008 | Lazerson | |
| 7,370,057 B2 | 5/2008 | Burdick et al. | |
| 7,376,603 B1 | 5/2008 | Mayr et al. | |
| 7,376,714 B1 | 5/2008 | Gerken | |
| 7,386,786 B2 | 6/2008 | Davis et al. | |
| 7,392,203 B2 | 6/2008 | Edison et al. | |
| 7,424,439 B1 | 9/2008 | Fayyad et al. | |
| 7,428,526 B2 | 9/2008 | Miller et al. | |
| 7,444,302 B2 | 10/2008 | Hu et al. | |
| 7,451,095 B1 | 11/2008 | Bradley et al. | |
| 7,458,508 B1 | 12/2008 | Shao et al. | |
| 7,467,106 B1 | 12/2008 | Levine et al. | |
| 7,472,088 B2 | 12/2008 | Taylor et al. | |
| 7,499,868 B2 | 3/2009 | Galperin et al. | |
| 7,529,689 B2 | 5/2009 | Rowan | |
| 7,546,266 B2 | 6/2009 | Beirne et al. | |
| 7,546,619 B2 | 6/2009 | Anderson et al. | |
| 7,556,192 B2 | 7/2009 | Wokaty, Jr. | |
| 7,562,184 B2 | 7/2009 | Henmi et al. | |
| 7,565,153 B2 | 7/2009 | Alcock et al. | |
| 7,571,139 B1 | 8/2009 | Giordano et al. | |
| 7,580,856 B1 | 8/2009 | Pliha | |
| 7,584,126 B1 | 9/2009 | White | |
| 7,590,589 B2 | 9/2009 | Hoffberg | |
| 7,593,893 B1 | 9/2009 | Ladd et al. | |
| 7,606,778 B2 | 10/2009 | Dewar | |
| 7,610,257 B1 | 10/2009 | Abrahams | |
| 7,617,136 B1 | 11/2009 | Lessing et al. | |
| 7,617,160 B1* | 11/2009 | Grove | G06Q 10/10 705/500 |
| 7,636,941 B2 | 12/2009 | Blinn et al. | |
| 7,653,592 B1 | 1/2010 | Flaxman et al. | |
| 7,668,840 B2 | 2/2010 | Bayliss et al. | |
| 7,672,865 B2 | 3/2010 | Kumar et al. | |
| 7,672,897 B2 | 3/2010 | Chung et al. | |
| 7,686,214 B1 | 3/2010 | Shao et al. | |
| 7,698,236 B2 | 4/2010 | Cox et al. | |
| 7,707,059 B2 | 4/2010 | Reed et al. | |
| 7,711,635 B2 | 5/2010 | Steele et al. | |
| 7,715,546 B2 | 5/2010 | Pagel et al. | |
| 7,720,750 B2 | 5/2010 | Brody | |
| 7,725,300 B2 | 5/2010 | Pinto et al. | |
| 7,730,509 B2 | 6/2010 | Boulet et al. | |
| 7,734,570 B2* | 6/2010 | Bachman | G06Q 30/02 |
| 7,742,982 B2 | 6/2010 | Chaudhuri et al. | |
| 7,752,236 B2 | 7/2010 | Williams et al. | |
| 7,783,515 B1 | 8/2010 | Kumar et al. | |
| 7,783,534 B2* | 8/2010 | Armstrong | G06Q 10/06375 700/100 |
| 7,788,147 B2 | 8/2010 | Haggerty et al. | |
| 7,793,835 B1 | 9/2010 | Coggeshall et al. | |
| 7,801,843 B2 | 9/2010 | Kumar et al. | |
| 7,814,004 B2 | 10/2010 | Haggerty et al. | |
| 7,853,700 B2 | 12/2010 | Lee et al. | |
| 7,877,320 B1 | 1/2011 | Downey | |
| 7,925,549 B2 | 4/2011 | Looney et al. | |
| 7,957,991 B2* | 6/2011 | Mikurak | G06Q 10/06 705/7.11 |
| 7,962,404 B1 | 6/2011 | Metzger, II et al. | |
| 7,962,501 B1 | 6/2011 | Semprevivo et al. | |
| 7,996,521 B2 | 8/2011 | Chamberlain et al. | |
| 8,005,712 B2 | 8/2011 | von Davier et al. | |
| 8,005,759 B2 | 8/2011 | Hirtenstein et al. | |
| 8,006,261 B1 | 8/2011 | Haberman et al. | |
| 8,015,045 B2 | 9/2011 | Galperin et al. | |
| 8,024,264 B2 | 9/2011 | Chaudhuri et al. | |
| 8,027,871 B2 | 9/2011 | Willams et al. | |
| 8,027,888 B2 | 9/2011 | Chandran et al. | |
| 8,032,409 B1* | 10/2011 | Mikurak | G06Q 10/00 705/14.39 |
| 8,078,453 B2 | 12/2011 | Shaw | |
| 8,078,524 B2 | 12/2011 | Crawford et al. | |
| 8,086,524 B1 | 12/2011 | Craig et al. | |
| 8,104,671 B2 | 1/2012 | Besecker et al. | |
| 8,126,805 B2 | 2/2012 | Sulkowski et al. | |
| 8,127,982 B1 | 3/2012 | Casey et al. | |
| 8,135,607 B2 | 3/2012 | Willams et al. | |
| 8,145,754 B2 | 3/2012 | Chamberlain et al. | |
| 8,161,104 B2 | 4/2012 | Tomkow | |
| 8,190,470 B2 | 5/2012 | Srivastava et al. | |
| 8,234,498 B2 | 7/2012 | Britti et al. | |
| 8,255,268 B2 | 8/2012 | Rane et al. | |
| 8,271,313 B2 | 9/2012 | Williams et al. | |
| 8,271,378 B2 | 9/2012 | Chaudhuri et al. | |
| 8,280,805 B1 | 10/2012 | Abrahams et al. | |
| 8,285,577 B1 | 10/2012 | Galperin et al. | |
| 8,285,656 B1 | 10/2012 | Chang et al. | |
| 8,296,229 B1 | 10/2012 | Yellin et al. | |
| 8,301,574 B2 | 10/2012 | Kilger et al. | |
| 8,346,593 B2 | 1/2013 | Fanelli | |
| 8,364,588 B2 | 1/2013 | Celka et al. | |
| 8,386,377 B1 | 2/2013 | Xiong et al. | |
| 8,392,334 B2 | 3/2013 | Hirtenstein et al. | |
| 8,412,593 B1 | 4/2013 | Song et al. | |
| 8,458,062 B2 | 6/2013 | Dutt et al. | |
| 8,468,198 B2 | 6/2013 | Tomkow | |
| 8,515,828 B1 | 8/2013 | Wolf et al. | |
| 8,515,862 B2 | 8/2013 | Zhang et al. | |
| 8,533,038 B2 | 9/2013 | Bergh et al. | |
| 8,533,322 B2 | 9/2013 | Chamberlain et al. | |
| 8,560,434 B2 | 10/2013 | Morris et al. | |
| 8,560,666 B2 | 10/2013 | Low | |
| 8,566,167 B2 | 10/2013 | Munjal | |
| 8,571,919 B2 | 10/2013 | Rane et al. | |
| 8,571,929 B2 | 10/2013 | Srivastava et al. | |
| 8,606,626 B1 | 12/2013 | DeSoto et al. | |
| 8,620,740 B2 | 12/2013 | Bergh et al. | |
| 8,626,563 B2 | 1/2014 | Williams et al. | |
| 8,630,929 B2 | 1/2014 | Haggerty et al. | |
| 8,639,920 B2 | 1/2014 | Stack et al. | |
| 8,694,361 B2 | 4/2014 | Durvasula et al. | |
| 8,732,004 B1 | 5/2014 | Ramos et al. | |
| 8,738,515 B2 | 5/2014 | Chaudhuri et al. | |
| 8,966,649 B2 | 2/2015 | Stack et al. | |
| 9,058,340 B1 | 6/2015 | Chamberlain et al. | |

(56) References Cited

U.S. PATENT DOCUMENTS

| | | |
|---|---|---|
| 9,152,727 B1 | 10/2015 | Balducci et al. |
| 9,213,646 B1 | 12/2015 | LaPanse et al. |
| 9,329,715 B2 | 5/2016 | Schwarz et al. |
| 9,471,928 B2 | 10/2016 | Fanelli et al. |
| 9,595,051 B2 | 3/2017 | Stack et al. |
| 9,704,192 B2 | 7/2017 | Ainsworth et al. |
| 9,767,309 B1 | 9/2017 | Patel et al. |
| 10,019,593 B1 | 7/2018 | Patel et al. |
| 10,089,664 B2 | 10/2018 | Hamdi et al. |
| 10,169,775 B2 | 1/2019 | Koltnow et al. |
| 10,292,008 B2 | 5/2019 | Nack et al. |
| 10,304,075 B2 | 5/2019 | Walz et al. |
| 10,354,311 B2 | 7/2019 | Ainsworth, III et al. |
| 10,380,619 B2 | 8/2019 | Pontious |
| 2001/0014868 A1 | 8/2001 | Herz et al. |
| 2001/0039523 A1 | 11/2001 | Iwamoto |
| 2002/0004754 A1* | 1/2002 | Gardenswartz ........ G06Q 30/02 705/26.1 |
| 2002/0023051 A1 | 2/2002 | Kunzle et al. |
| 2002/0029162 A1 | 3/2002 | Mascarenhas |
| 2002/0046099 A1 | 4/2002 | Frengut et al. |
| 2002/0046105 A1* | 4/2002 | Gardenswartz ........ G06Q 30/02 705/14.25 |
| 2002/0049968 A1 | 4/2002 | Wilson et al. |
| 2002/0051020 A1 | 5/2002 | Ferrari et al. |
| 2002/0055906 A1 | 5/2002 | Katz et al. |
| 2002/0065716 A1 | 5/2002 | Kuschill |
| 2002/0069203 A1 | 6/2002 | Dar et al. |
| 2002/0077890 A1 | 6/2002 | LaPointe et al. |
| 2002/0077964 A1 | 6/2002 | Brody et al. |
| 2002/0082892 A1 | 6/2002 | Raffel et al. |
| 2002/0083043 A1 | 6/2002 | Hoshi et al. |
| 2002/0099641 A1 | 7/2002 | Mills et al. |
| 2002/0099824 A1 | 7/2002 | Bender et al. |
| 2002/0099936 A1 | 7/2002 | Kou et al. |
| 2002/0116253 A1 | 8/2002 | Coyne et al. |
| 2002/0120504 A1 | 8/2002 | Gould et al. |
| 2002/0123904 A1 | 9/2002 | Amengual et al. |
| 2002/0123928 A1 | 9/2002 | Eldering et al. |
| 2002/0128960 A1 | 9/2002 | Lambiotte et al. |
| 2002/0129368 A1 | 9/2002 | Schlack et al. |
| 2002/0133404 A1 | 9/2002 | Pedersen |
| 2002/0138331 A1 | 9/2002 | Hosea et al. |
| 2002/0138333 A1 | 9/2002 | DeCotiis et al. |
| 2002/0138334 A1 | 9/2002 | DeCotiis et al. |
| 2002/0147669 A1 | 10/2002 | Taylor et al. |
| 2002/0147695 A1 | 10/2002 | Khedkar et al. |
| 2002/0161664 A1 | 10/2002 | Shaya et al. |
| 2002/0169655 A1 | 11/2002 | Beyer et al. |
| 2003/0018769 A1 | 1/2003 | Foulger et al. |
| 2003/0023489 A1 | 1/2003 | McGuire et al. |
| 2003/0033242 A1 | 2/2003 | Lynch et al. |
| 2003/0041050 A1 | 2/2003 | Smith et al. |
| 2003/0046222 A1 | 3/2003 | Bard et al. |
| 2003/0060284 A1 | 3/2003 | Hamalainen et al. |
| 2003/0061233 A1 | 3/2003 | Manasse et al. |
| 2003/0065563 A1 | 4/2003 | Elliott et al. |
| 2003/0093311 A1 | 5/2003 | Knowlson |
| 2003/0110293 A1 | 6/2003 | Friedman et al. |
| 2003/0120591 A1 | 6/2003 | Birkhead et al. |
| 2003/0144950 A1 | 7/2003 | O'Brien et al. |
| 2003/0158776 A1 | 8/2003 | Landesmann |
| 2003/0163708 A1 | 8/2003 | Tang |
| 2003/0167222 A1 | 9/2003 | Mehrotra et al. |
| 2003/0200135 A1 | 10/2003 | Wright |
| 2003/0216965 A1 | 11/2003 | Libman |
| 2003/0229507 A1 | 12/2003 | Perge |
| 2003/0229892 A1 | 12/2003 | Sardera |
| 2003/0233278 A1 | 12/2003 | Marshall |
| 2003/0233323 A1 | 12/2003 | Bilski et al. |
| 2003/0233655 A1 | 12/2003 | Gutta et al. |
| 2004/0024848 A1 | 2/2004 | Smith |
| 2004/0039688 A1 | 2/2004 | Sulkowski et al. |
| 2004/0049729 A1 | 3/2004 | Penfield |
| 2004/0059626 A1 | 3/2004 | Smallwood |
| 2004/0062213 A1 | 4/2004 | Koss |
| 2004/0078809 A1 | 4/2004 | Drazin |
| 2004/0083215 A1 | 4/2004 | de Jong |
| 2004/0098625 A1 | 5/2004 | Lagadec et al. |
| 2004/0102197 A1 | 5/2004 | Dietz |
| 2004/0107125 A1 | 6/2004 | Guheen et al. |
| 2004/0122730 A1 | 6/2004 | Tucciarone et al. |
| 2004/0122735 A1 | 6/2004 | Meshkin |
| 2004/0128193 A1 | 7/2004 | Brice et al. |
| 2004/0128236 A1 | 7/2004 | Brown et al. |
| 2004/0138932 A1 | 7/2004 | Johnson et al. |
| 2004/0139025 A1 | 7/2004 | Coleman |
| 2004/0153509 A1 | 8/2004 | Alcorn et al. |
| 2004/0163101 A1 | 8/2004 | Swix |
| 2004/0176995 A1 | 9/2004 | Fusz |
| 2004/0193487 A1 | 9/2004 | Purcell et al. |
| 2004/0199456 A1 | 10/2004 | Flint et al. |
| 2004/0199584 A1 | 10/2004 | Kirshenbaum et al. |
| 2004/0199789 A1 | 10/2004 | Shaw et al. |
| 2004/0205157 A1 | 10/2004 | Bibelnieks et al. |
| 2004/0230820 A1 | 11/2004 | Hui Hsu et al. |
| 2004/0261116 A1 | 12/2004 | Mckeown et al. |
| 2005/0021397 A1 | 1/2005 | Cui et al. |
| 2005/0050027 A1 | 3/2005 | Yeh et al. |
| 2005/0065809 A1 | 3/2005 | Henze |
| 2005/0091077 A1* | 4/2005 | Reynolds ............... G06Q 10/06 705/7.33 |
| 2005/0097039 A1 | 5/2005 | Kulcsar et al. |
| 2005/0120045 A1 | 6/2005 | Klawon |
| 2005/0120249 A1 | 6/2005 | Shuster |
| 2005/0144067 A1 | 6/2005 | Farahat et al. |
| 2005/0144641 A1 | 6/2005 | Lewis |
| 2005/0177442 A1 | 8/2005 | Sullivan et al. |
| 2005/0177489 A1 | 8/2005 | Neff et al. |
| 2005/0192008 A1 | 9/2005 | Desai et al. |
| 2005/0201272 A1 | 9/2005 | Wang et al. |
| 2005/0204381 A1 | 9/2005 | Ludvig et al. |
| 2005/0209922 A1 | 9/2005 | Hofmeister |
| 2005/0222900 A1 | 10/2005 | Fuloria et al. |
| 2005/0222906 A1 | 10/2005 | Chen |
| 2005/0233742 A1 | 10/2005 | Karaoguz et al. |
| 2005/0234969 A1 | 10/2005 | Mamou et al. |
| 2005/0251820 A1 | 11/2005 | Stefanik et al. |
| 2005/0257250 A1 | 11/2005 | Mitchell et al. |
| 2005/0261959 A1 | 11/2005 | Moyer |
| 2005/0273849 A1 | 12/2005 | Araujo et al. |
| 2005/0278246 A1 | 12/2005 | Friedman et al. |
| 2005/0278743 A1 | 12/2005 | Flickinger et al. |
| 2005/0288954 A1 | 12/2005 | McCarthy et al. |
| 2006/0004626 A1 | 1/2006 | Holmen et al. |
| 2006/0004731 A1 | 1/2006 | Seibel et al. |
| 2006/0020611 A1 | 1/2006 | Gilbert et al. |
| 2006/0041443 A1 | 2/2006 | Horvath |
| 2006/0041500 A1 | 2/2006 | Diana et al. |
| 2006/0053047 A1 | 3/2006 | Garcia et al. |
| 2006/0059073 A1 | 3/2006 | Walzak |
| 2006/0080233 A1 | 4/2006 | Mendelovich et al. |
| 2006/0080251 A1 | 4/2006 | Fried et al. |
| 2006/0089914 A1* | 4/2006 | Shiel ...................... G06Q 30/00 705/52 |
| 2006/0095363 A1 | 5/2006 | May |
| 2006/0100954 A1 | 5/2006 | Schoen |
| 2006/0122921 A1 | 6/2006 | Comerford et al. |
| 2006/0144927 A1 | 7/2006 | Love et al. |
| 2006/0155639 A1 | 7/2006 | Lynch et al. |
| 2006/0168068 A1 | 7/2006 | Ziegert |
| 2006/0173772 A1 | 8/2006 | Hayes et al. |
| 2006/0178189 A1 | 8/2006 | Walker et al. |
| 2006/0178918 A1* | 8/2006 | Mikurak ................ G06Q 10/06 705/7.25 |
| 2006/0178971 A1 | 8/2006 | Owen et al. |
| 2006/0178983 A1 | 8/2006 | Nice et al. |
| 2006/0195866 A1 | 8/2006 | Thukral |
| 2006/0206379 A1 | 9/2006 | Rosenberg |
| 2006/0206416 A1 | 9/2006 | Farias |
| 2006/0212350 A1 | 9/2006 | Ellis et al. |
| 2006/0212353 A1 | 9/2006 | Roslov et al. |
| 2006/0218079 A1 | 9/2006 | Goldblatt et al. |
| 2006/0224696 A1 | 10/2006 | King et al. |

(56) References Cited

U.S. PATENT DOCUMENTS

| | | |
|---|---|---|
| 2006/0229943 A1 | 10/2006 | Mathias et al. |
| 2006/0229996 A1 | 10/2006 | Keithley et al. |
| 2006/0230415 A1 | 10/2006 | Roeding |
| 2006/0241923 A1 | 10/2006 | Xu et al. |
| 2006/0242046 A1 | 10/2006 | Haggerty et al. |
| 2006/0242050 A1 | 10/2006 | Haggerty et al. |
| 2006/0247991 A1 | 11/2006 | Jin et al. |
| 2006/0253323 A1 | 11/2006 | Phan et al. |
| 2006/0259364 A1 | 11/2006 | Strock et al. |
| 2006/0276171 A1 | 12/2006 | Pousti |
| 2006/0277102 A1 | 12/2006 | Agliozzo |
| 2006/0282327 A1 | 12/2006 | Neal et al. |
| 2006/0282328 A1 | 12/2006 | Gerace et al. |
| 2006/0282856 A1 | 12/2006 | Errico et al. |
| 2006/0287915 A1 | 12/2006 | Boulet et al. |
| 2006/0287919 A1 | 12/2006 | Rubens et al. |
| 2006/0293921 A1 | 12/2006 | McCarthy et al. |
| 2006/0293954 A1 | 12/2006 | Anderson et al. |
| 2006/0293955 A1 | 12/2006 | Wilson et al. |
| 2006/0294199 A1 | 12/2006 | Bertholf |
| 2007/0011020 A1 | 1/2007 | Martin |
| 2007/0011039 A1 | 1/2007 | Oddo |
| 2007/0011099 A1 | 1/2007 | Sheehan |
| 2007/0016518 A1 | 1/2007 | Atkinson et al. |
| 2007/0022032 A1 | 1/2007 | Anderson et al. |
| 2007/0027791 A1 | 2/2007 | Young et al. |
| 2007/0033227 A1 | 2/2007 | Gaito et al. |
| 2007/0038516 A1 | 2/2007 | Apple et al. |
| 2007/0061195 A1 | 3/2007 | Liu et al. |
| 2007/0061243 A1 | 3/2007 | Ramer et al. |
| 2007/0067297 A1 | 3/2007 | Kublickis |
| 2007/0067437 A1 | 3/2007 | Sindambiwe |
| 2007/0078835 A1 | 4/2007 | Donnelli |
| 2007/0121843 A1 | 5/2007 | Atazky et al. |
| 2007/0129993 A1 | 6/2007 | Alvin |
| 2007/0156515 A1 | 7/2007 | Hasselback et al. |
| 2007/0156589 A1 | 7/2007 | Zimler et al. |
| 2007/0157110 A1 | 7/2007 | Gandhi et al. |
| 2007/0169189 A1 | 7/2007 | Crespo et al. |
| 2007/0174122 A1 | 7/2007 | Howard et al. |
| 2007/0175986 A1 | 8/2007 | Petrone et al. |
| 2007/0192165 A1 | 8/2007 | Haggerty et al. |
| 2007/0192409 A1 | 8/2007 | Kleinstern et al. |
| 2007/0208619 A1 | 9/2007 | Branam et al. |
| 2007/0220553 A1 | 9/2007 | Branam et al. |
| 2007/0220611 A1 | 9/2007 | Socolow et al. |
| 2007/0233857 A1 | 10/2007 | Cheng et al. |
| 2007/0244732 A1 | 10/2007 | Chatterji et al. |
| 2007/0271178 A1 | 11/2007 | Davis et al. |
| 2007/0271582 A1 | 11/2007 | Ellis et al. |
| 2007/0282684 A1 | 12/2007 | Prosser et al. |
| 2007/0288271 A1 | 12/2007 | Klinkhammer |
| 2007/0288950 A1 | 12/2007 | Downey et al. |
| 2007/0288953 A1 | 12/2007 | Sheeman et al. |
| 2007/0294126 A1 | 12/2007 | Maggio |
| 2007/0294163 A1 | 12/2007 | Harmon et al. |
| 2007/0299771 A1 | 12/2007 | Brody |
| 2008/0004957 A1 | 1/2008 | Hildreth et al. |
| 2008/0005313 A1 | 1/2008 | Flake et al. |
| 2008/0010206 A1 | 1/2008 | Coleman |
| 2008/0021802 A1 | 1/2008 | Pendleton |
| 2008/0028067 A1 | 1/2008 | Berkhin et al. |
| 2008/0040216 A1 | 2/2008 | Dellovo |
| 2008/0059317 A1 | 3/2008 | Chandran et al. |
| 2008/0059352 A1 | 3/2008 | Chandran |
| 2008/0065774 A1 | 3/2008 | Keeler |
| 2008/0086368 A1 | 4/2008 | Bauman et al. |
| 2008/0091535 A1 | 4/2008 | Heiser et al. |
| 2008/0097928 A1 | 4/2008 | Paulson |
| 2008/0120155 A1 | 5/2008 | Pliha |
| 2008/0126476 A1 | 5/2008 | Nicholas et al. |
| 2008/0133325 A1 | 6/2008 | De et al. |
| 2008/0134042 A1 | 6/2008 | Jankovich |
| 2008/0140476 A1 | 6/2008 | Anand et al. |
| 2008/0147425 A1 | 6/2008 | Durvasula |
| 2008/0167956 A1 | 7/2008 | Keithley |
| 2008/0177836 A1 | 7/2008 | Bennett |
| 2008/0183564 A1 | 7/2008 | Tien et al. |
| 2008/0184289 A1 | 7/2008 | Cristofalo et al. |
| 2008/0208548 A1 | 8/2008 | Metzger et al. |
| 2008/0215470 A1 | 9/2008 | Sengupta et al. |
| 2008/0222127 A1* | 9/2008 | Bergin .............. G06Q 10/10 |
| 2008/0228578 A1 | 9/2008 | Mashinsky |
| 2008/0228635 A1 | 9/2008 | Megdal et al. |
| 2008/0255897 A1 | 10/2008 | Megdal et al. |
| 2008/0294540 A1 | 11/2008 | Celka et al. |
| 2008/0294546 A1 | 11/2008 | Flannery |
| 2008/0301727 A1 | 12/2008 | Cristofalo et al. |
| 2009/0006475 A1 | 1/2009 | Udezue et al. |
| 2009/0018996 A1 | 1/2009 | Hunt et al. |
| 2009/0019027 A1 | 1/2009 | Ju et al. |
| 2009/0024462 A1 | 1/2009 | Lin |
| 2009/0044246 A1 | 2/2009 | Sheehan et al. |
| 2009/0064326 A1 | 3/2009 | Goldstein |
| 2009/0076883 A1 | 3/2009 | Kilger et al. |
| 2009/0089205 A1 | 4/2009 | Bayne |
| 2009/0094640 A1 | 4/2009 | Anderson et al. |
| 2009/0113532 A1 | 4/2009 | Lapidous |
| 2009/0119169 A1 | 5/2009 | Chandratillake et al. |
| 2009/0119199 A1 | 5/2009 | Salahi |
| 2009/0132347 A1 | 5/2009 | Anderson et al. |
| 2009/0132559 A1 | 5/2009 | Chamberlain et al. |
| 2009/0132691 A1 | 5/2009 | Daurensan et al. |
| 2009/0133058 A1 | 5/2009 | Kouritzin et al. |
| 2009/0144102 A1 | 6/2009 | Lopez |
| 2009/0144201 A1 | 6/2009 | Gierkink et al. |
| 2009/0164293 A1* | 6/2009 | Coley .............. G06Q 10/06311 705/7.13 |
| 2009/0171755 A1 | 7/2009 | Kane et al. |
| 2009/0172035 A1 | 7/2009 | Lessing et al. |
| 2009/0177480 A1 | 7/2009 | Chen et al. |
| 2009/0215479 A1 | 8/2009 | Karmarkar |
| 2009/0222380 A1 | 9/2009 | Choudhuri et al. |
| 2009/0228918 A1 | 9/2009 | Rolff et al. |
| 2009/0234665 A1 | 9/2009 | Conkel |
| 2009/0234708 A1 | 9/2009 | Heiser, II et al. |
| 2009/0234715 A1 | 9/2009 | Heiser, II et al. |
| 2009/0249440 A1 | 10/2009 | Platt et al. |
| 2009/0265326 A1 | 10/2009 | Lehrman et al. |
| 2009/0288109 A1 | 11/2009 | Downey et al. |
| 2009/0313163 A1 | 12/2009 | Wang et al. |
| 2009/0319648 A1 | 12/2009 | Dutta et al. |
| 2010/0010935 A1 | 1/2010 | Shelton |
| 2010/0017300 A1 | 1/2010 | Bramlage et al. |
| 2010/0030649 A1 | 2/2010 | Ubelhor |
| 2010/0037255 A1 | 2/2010 | Sheehan et al. |
| 2010/0094704 A1 | 4/2010 | Subramanian et al. |
| 2010/0094758 A1 | 4/2010 | Chamberlain et al. |
| 2010/0106568 A1 | 4/2010 | Grimes |
| 2010/0114663 A1 | 5/2010 | Casas et al. |
| 2010/0138290 A1 | 6/2010 | Zschocke et al. |
| 2010/0169159 A1 | 7/2010 | Rose et al. |
| 2010/0169264 A1 | 7/2010 | O'Sullivan |
| 2010/0185453 A1 | 7/2010 | Satyavolu et al. |
| 2010/0191598 A1* | 7/2010 | Toennis .............. G06Q 30/02 705/14.36 |
| 2010/0211445 A1 | 8/2010 | Bodington |
| 2010/0268660 A1 | 10/2010 | Ekdahl |
| 2011/0023115 A1 | 1/2011 | Wright |
| 2011/0029388 A1 | 2/2011 | Kendall et al. |
| 2011/0066495 A1 | 3/2011 | Ayloo et al. |
| 2011/0071950 A1 | 3/2011 | Ivanovic |
| 2011/0076663 A1 | 3/2011 | Krallman et al. |
| 2011/0078018 A1 | 3/2011 | Chunilal |
| 2011/0078073 A1 | 3/2011 | Annappindi et al. |
| 2011/0093327 A1 | 4/2011 | Fordyce, III et al. |
| 2011/0125595 A1 | 5/2011 | Neal et al. |
| 2011/0137789 A1 | 6/2011 | Kortina et al. |
| 2011/0164746 A1 | 7/2011 | Nice et al. |
| 2011/0178843 A1 | 7/2011 | Rane et al. |
| 2011/0178844 A1 | 7/2011 | Rane et al. |
| 2011/0178845 A1 | 7/2011 | Rane et al. |
| 2011/0178846 A1 | 7/2011 | Rane et al. |
| 2011/0178847 A1 | 7/2011 | Rane et al. |

(56) References Cited

U.S. PATENT DOCUMENTS

| | | |
|---|---|---|
| 2011/0178848 A1 | 7/2011 | Rane et al. |
| 2011/0178855 A1 | 7/2011 | Rane et al. |
| 2011/0178899 A1 | 7/2011 | Huszar |
| 2011/0202407 A1 | 8/2011 | Buhrmann et al. |
| 2011/0208578 A1 | 8/2011 | Bergh et al. |
| 2011/0211445 A1 | 9/2011 | Chen |
| 2011/0212717 A1 | 9/2011 | Rhoads et al. |
| 2011/0213641 A1 | 9/2011 | Metzger, II et al. |
| 2011/0219421 A1 | 9/2011 | Ullman et al. |
| 2011/0258050 A1 | 10/2011 | Chan et al. |
| 2011/0264581 A1 | 10/2011 | Clyne |
| 2011/0270618 A1 | 11/2011 | Banerjee et al. |
| 2011/0270661 A1 | 11/2011 | Heiser, II et al. |
| 2011/0282739 A1 | 11/2011 | Mashinsky et al. |
| 2011/0307397 A1 | 12/2011 | Benmbarek |
| 2012/0011056 A1 | 1/2012 | Ward et al. |
| 2012/0011068 A1* | 1/2012 | Dearing ............... G06Q 10/083 705/50 |
| 2012/0011158 A1 | 1/2012 | Avner et al. |
| 2012/0016733 A1* | 1/2012 | Belvin ................. G06Q 30/02 705/14.41 |
| 2012/0016948 A1 | 1/2012 | Sinha |
| 2012/0047219 A1 | 2/2012 | Feng et al. |
| 2012/0054592 A1 | 3/2012 | Jaffe et al. |
| 2012/0060207 A1 | 3/2012 | Mardikar et al. |
| 2012/0066065 A1 | 3/2012 | Switzer |
| 2012/0101892 A1 | 4/2012 | LeFebvre |
| 2012/0110677 A1 | 5/2012 | Abendroth et al. |
| 2012/0143921 A1 | 6/2012 | Wilson |
| 2012/0179536 A1 | 7/2012 | Kalb et al. |
| 2012/0203639 A1 | 8/2012 | Webster et al. |
| 2012/0209586 A1 | 8/2012 | Mieritz et al. |
| 2012/0239497 A1 | 9/2012 | Nuzzi |
| 2012/0239515 A1 | 9/2012 | Batra et al. |
| 2013/0080242 A1 | 3/2013 | Alhadeff et al. |
| 2013/0080467 A1 | 3/2013 | Carson et al. |
| 2013/0085804 A1 | 4/2013 | Leff et al. |
| 2013/0117832 A1 | 5/2013 | Gandhi |
| 2013/0132151 A1 | 5/2013 | Stibel et al. |
| 2013/0173481 A1 | 7/2013 | Hirtenstein et al. |
| 2013/0218638 A1 | 8/2013 | Kilger et al. |
| 2013/0252638 A1 | 9/2013 | Yang et al. |
| 2013/0262226 A1 | 10/2013 | LaChapelle et al. |
| 2013/0293363 A1 | 11/2013 | Plymouth |
| 2013/0332230 A1 | 12/2013 | Fanelli et al. |
| 2013/0339087 A1 | 12/2013 | Fanelli et al. |
| 2013/0339143 A1 | 12/2013 | Drozd et al. |
| 2014/0025489 A1 | 1/2014 | Srivastava et al. |
| 2014/0025815 A1 | 1/2014 | Low |
| 2014/0032265 A1 | 1/2014 | Paprocki et al. |
| 2014/0046887 A1 | 2/2014 | Lessin |
| 2014/0058818 A1 | 2/2014 | Drozd et al. |
| 2014/0096249 A1 | 4/2014 | Dupont et al. |
| 2014/0164112 A1 | 6/2014 | Kala |
| 2014/0164398 A1 | 6/2014 | Smith et al. |
| 2014/0188555 A1 | 7/2014 | Durvasula |
| 2014/0214482 A1 | 7/2014 | Williams et al. |
| 2014/0222908 A1 | 8/2014 | Park et al. |
| 2014/0279420 A1 | 9/2014 | Okerlund et al. |
| 2014/0330670 A1 | 11/2014 | Ainsworth, III et al. |
| 2015/0058957 A1 | 2/2015 | Halliday et al. |
| 2015/0095104 A1 | 4/2015 | Goldberg |
| 2015/0106270 A1 | 4/2015 | Burrell et al. |
| 2015/0128240 A1 | 5/2015 | Richards et al. |
| 2015/0128287 A1 | 5/2015 | LaFever |
| 2015/0262248 A1 | 9/2015 | Chaouki et al. |
| 2015/0278225 A1 | 10/2015 | Weiss et al. |
| 2015/0295906 A1 | 10/2015 | Ufford et al. |
| 2015/0332391 A1 | 11/2015 | Srivastava et al. |
| 2015/0348200 A1 | 12/2015 | Fair et al. |
| 2016/0055487 A1 | 2/2016 | Votaw et al. |
| 2016/0071175 A1 | 3/2016 | Reuss et al. |
| 2016/0092997 A1 | 3/2016 | Shen et al. |
| 2016/0371740 A1 | 12/2016 | Heiser, II et al. |
| 2017/0032393 A1 | 2/2017 | Fanelli et al. |
| 2017/0186297 A1 | 6/2017 | Brenner |
| 2017/0193315 A1 | 7/2017 | El-Khamy et al. |
| 2018/0060954 A1 | 3/2018 | Yin |
| 2019/0087848 A1 | 3/2019 | Koltnow et al. |
| 2019/0147519 A1 | 5/2019 | Ainsworth, III et al. |
| 2019/0164184 A1 | 5/2019 | Walz |
| 2019/0180327 A1 | 6/2019 | Balagopalan et al. |
| 2019/0230464 A1 | 7/2019 | Nack et al. |
| 2019/0244237 A1 | 8/2019 | Magnuson, Jr. et al. |

FOREIGN PATENT DOCUMENTS

| | | |
|---|---|---|
| EP | 0 554 083 | 8/1993 |
| EP | 0 749 081 | 12/1996 |
| EP | 1 028 401 | 8/2000 |
| EP | 1 122 664 | 8/2001 |
| JP | 10-293732 | 11/1998 |
| JP | 11-068828 | 3/1999 |
| KR | 10-2013-0107394 | 10/2013 |
| TW | 256569 | 6/2006 |
| WO | WO 91/003789 | 3/1991 |
| WO | WO 94/006103 | 3/1994 |
| WO | WO 95/016971 | 6/1995 |
| WO | WO 96/042041 | 12/1996 |
| WO | WO 97/023838 | 7/1997 |
| WO | WO 98/041913 | 9/1998 |
| WO | WO 98/049643 | 11/1998 |
| WO | WO 98/057285 | 12/1998 |
| WO | WO 99/004350 | 1/1999 |
| WO | WO 99/022328 | 5/1999 |
| WO | WO 99/032985 | 7/1999 |
| WO | WO 99/033012 | 7/1999 |
| WO | WO 99/037066 | 7/1999 |
| WO | WO 99/059375 | 11/1999 |
| WO | WO 99/067731 | 12/1999 |
| WO | WO 00/055789 | 9/2000 |
| WO | WO 00/055790 | 9/2000 |
| WO | WO 00/068862 | 11/2000 |
| WO | WO 01/010090 | 2/2001 |
| WO | WO 01/011522 | 2/2001 |
| WO | WO 01/075754 | 10/2001 |
| WO | WO 02/013025 | 2/2002 |
| WO | WO 03/101123 | 12/2003 |
| WO | WO 2006/110873 | 10/2006 |
| WO | WO 2007/149941 | 12/2007 |
| WO | WO 2008/022289 | 2/2008 |
| WO | WO 2008/057853 | 5/2008 |
| WO | WO 2008/076343 | 6/2008 |
| WO | WO 2008/127288 | 10/2008 |
| WO | WO 2009/132114 | 10/2009 |
| WO | WO 2010/045160 | 4/2010 |
| WO | WO 2010/062537 | 6/2010 |
| WO | WO 2010/132492 | 11/2010 |
| WO | WO 2010/150251 | 12/2010 |
| WO | WO 2011/005876 | 1/2011 |
| WO | WO 2014/018900 | 1/2014 |
| WO | WO 2018/039377 | 3/2018 |
| ZA | 2009/03243 | 3/2010 |

OTHER PUBLICATIONS

U.S. Appl. No. 12/705,511, filed Feb. 12, 2010 Bargoli et al.

"Accenture Launches Media Audit and Optimization Service to Help U.S. Companies Measure Return on Investment in Advertising," Business Wire, May 22, 2006, 2 pages, http://findarticles.com/p/articles/mi_m0EIN/is_2006_May_22/ai_n16374159.

"Accenture Newsroom: Accenture Completes Acquisition of Media Audits: Acquisition Expands Company's Marketing Sciences and Data Services Capabilities," accenture.com, Dec. 12, 2005, 2 pages, http://accenture.tekgroup.com/article_display.cfm?article_id=428.

"Aggregate and Analyze Social Media Content: Gain Faster and Broader Insight to Market Sentiment," SAP Partner, Mantis Technology Group, Apr. 2011, pp. 4.

Akl, Selim G., "Digital Signatures: A Tutorial Survey," Computer, Feb. 1983, pp. 15-24.

"Atlas on Demand, Concurrent, and Everstream Strike Video-on-Demand Advertising Alliance", www.atlassolutions.com, Jul. 13, 2006, 3 pages.

(56) References Cited

OTHER PUBLICATIONS

"Arbitron 2006 Black Consumers," Arbitron Inc., lvtsg.com, Jul. 8, 2006, 2 pages, http://www.lvtsg.com/news/publish/Factoids/article_3648.shtml.

"Atlas On Demand and C-COR Join Forces to Offer Advertising Management Solution for on Demand TV: Global Provider of on Demand Systems Partners with Atlas to Develop and Market Comprehensive VOD Advertising Solution," www.atlassolutions.com, Jul. 25, 2005, 3 pages.

"Atlas On Demand and Tandberg Television Join Forces to Enhance Dynamic Ad Placement for On-Demand Television: Combined End-to End Solution to Provide Media Buying and Selling Communities with New Tools for Dynamic Advertising that Eliminate Technical Bar" Jun. 22, 2006—3 pages, http://www.atlassolutions.com/news_20060622.aspx.

ADZILLA, Press Release, "ZILLACASTING Technology Approved and Patent Pending," http://www.adzilla.com/newsroom/pdf/patent_051605.pdf, May 16, 2005, pp. 2.

AFX New Limited—AFX International Focus, "Nielsen moving to measure off-TV viewing," Jun. 14, 2006, 1 page.

Applied Geographic Solutions, "What is MOSAIC™", as captured Feb. 15, 2004 from http://web.archive.org/web/20040215224329/http://www.appliedgeographic.com/mosaic.html in 2 pages.

Axiom, "Capabilites", http://www.axiomcom.com/capabilities/, printed May 7, 2015 in 2 pages.

Bachman, Katy, "Arbitron, VNU Launch Apollo Project," mediaweek.com Jan. 17, 2006, 3 pages, http://www.mediaweek.com/mw/search/article_display.jsp?schema=&vnu_content_id=1001847353.

Bagozzi et al., "On the Evaluation of Structural Equation Models", JAMS, 1988, pp. 74-94.

"Bank of America Direct Web-Based Network Adds Core Functionality to Meet Day-to-Day Treasury Needs", Business Wire, Oct. 25, 1999. pp. 2.

"Bank of America Launches Total Security Protection™; Features Address Cardholders' Financial Safety Concerns; Supported by $26 Million National Advertising Campaign; Free Educational Materials", PR Newswire, Oct. 9, 2002, pp. 2.

Bitran et al., "Mailing Decisions in Catalog Sales Industry", Management Science (JSTOR), vol. 42, No. 9, pp. 1364-1381, Sep. 1996.

Blackbaud.com, www.blackbaud.com, various pages, retrieved Jan. 22, 2009 from www.archive.org, 23 pages.

Brown et al., "ALCOD IDSS: Assisting the Australian Stock Market Surveillance Team's Review Process," Applied Artificial Intelligence Journal, Dec. 1, 1996, pp. 625-641.

Bult et al., "Optimal Selection for Direct Mail," Marketing Science, 1995, vol. 14, No. 4, pp. 378-394.

Burr Ph.D., et al., "Utility Payments as Alternative Credit Data: A Reality Check", Asset Builders of America, Inc., Oct. 5, 2006, pp. 1-18, Washington, D.C.

"Cable Solution Now, The Industry Standard for Information Management: Strata's TIM.net Crosses Important Threshold Dominant Solution for All Top 20 TV Markets," stratag.com, Apr. 28, 2006, 1 page, http://stratag.com/news/cablepress042806.html.

Caliendo, et al., "Some Practical Guidance for the Implementation of Propensity Score Matching", IZA:Discussion Paper Series, No. 1588, Germany, May 2005, pp. 32.

Card Marketing, Use the Latest CRM Tools and Techniques, www.CardForum.com, vol. 5 No. 10, Dec. 2001.

ChannelWave.com, PRM Central—About PRM, http://web.archive.org/web/20000510214859/http://www.channelwave.com as printed on Jun. 21, 2006, May 2000 Archive.

"Chase Gets Positive," Bank Technology News, May 6, 2000, vol. 14, No. 5, p. 33.

Chung, Charles; Internet Retailer, "Multi-channel retailing requires the cleanest data—but don't expect it from the customer", Jan./Feb. 2002.

"Claritas Forms Life Insurance Consortium with Worldwide Financial Services Association: Initiative with LIMRA International is First of its Kind to Provide Actual Sales Information at Small Geographic Areas," Feb. 9, 2006, 3 pages, http://www.claritas.com/claritas/Default/jsp?ci=5&si=1&pn=limra.

"Claritas Introduces PRIZM NE Consumer Electronic Monitor Profiles: New Information Product Provides Insight Into the Public's Purchasing Behaviors of Consumer Electronics," May 30, 2006, 3 pages.

"Cole Taylor Bank Chooses Integrated E-Banking/E-Payments/Reconciliation Solution From Fundtech", Business Wire, Oct. 21, 1999, pp. 2.

Click Z, "ISPs Collect User Data for Behavioral Ad Targeting," dated Jan. 3, 2008, printed from http://www.clickz.com/showPage.html?page=clickz Apr. 16, 2008.

CNet news.com, "Target me with your ads, please," dated Dec. 5, 2007, printed from http://www.news.com/2102-1024_3-6221241.html?tag+st.util.print Mar. 18, 2008.

Creamer, Matthew; Consulting in marketing; Accenture, Others Playing Role in Firms' Processes, Crain's Chicago Business, Jun. 12, 2006, 2 pages.

Culhane, Patrick, "Data: Powerfully Linking Service and Profitability," Jul./Aug. 1996, Bank Management, vol. 72, No. 4, pp. 8-12.

"Database Marketing: A new Approach to the Old Relationships," Chain Storage Executive Edition, Dialogue, Sep. 1991, pp. 2.

Davies, Donald W., "Applying the RSA Digital Signature to Electronic Mail," Computer, Feb. 1983, pp. 55-62.

Davis et al., "User Acceptance of Computer Technology: A Comparison of Two Theoretical Models", Management Science, Aug. 1989, vol. 35, No. 8, pp. 982-1003.

DeGruchy, et al., "Geodemographic Profiling Benefits Stop-Smoking Service;" The British Journal of Healthcare Computing & Information Management; Feb. 2007; 24, 7; pp. 29-31.

Delany et al., "Firm Mines Offline Data to Target Online", http://web.archive.org/web/20071117140456/http://www.commercialalert.org/news/archive/2007/10/firm-mines-offline-data-to-target-online-ads, Commercial Alert, Oct. 17, 2007, pp. 3.

demographicsnow.com, sample reports, "Age Rank Report", Jul. 17, 2006, 3 pages.

demographicsnow.com, sample reports, "Consumer Expenditure Summary Report", Jul. 17, 2006, 3 pages.

demographicsnow.com, sample reports, "Income Comparison Report", Jul. 17, 2006, 4 pages.

Dolnicar, Sara, "Using Cluster Analysis for Market Segmentation—Typical Misconceptions, Established Methodological Weaknesses and Some Recommendations for Improvement," Australasian Journal of Market Research, 2003, vol. 11, No. 2, pp. 5-12.

Downey, Sarah A., "Smile, you're on Spokeo.com! Concerned? (here's what to do)", https://www.abine.com/blog/2011/how-to-remove-yourself-from-spokeo/, as posted Jan. 13, 2011 in 7 pages.

Drawbridge, "Customer Success", http://www.drawbrid.ge/customer-success, printed May 7, 2015 in 17 pages.

Drawbridge, "Solutions", http://www.drawbrid.ge/solutions, printed May 7, 2015 in 5 pages.

Drawbridge, "Technology", http://www.drawbrid.ge/technology, printed May 7, 2015 in 3 pages.

Dstillery, "Products", http://dstillery.com/how-we-do-it/products/, printed May 7, 2015 in 2 pages.

Dstillery, "What We Do", http://dstillery.com/what-we-do/, printed May 7, 2015 in 2 pages.

Dstillery, "Who We Are", http://dstillery.com/who-we-are/, printed May 7, 2015 in 2 pages.

Dymi, Amilda, Need for Leads Spurs Some Upgrades, Origination News-Special Report, May 1, 2008, vol. vol. 17, Issue No. 8, pp. p. 24, Atlanta, Copyright 2008 SourceMedia, Inc.

Egol, Len; "What's New in Database Marketing Software," Direct, Aug. 1994, vol. 6, No. 8, pp. 39.

"Epsilon Leads Discussion on Paradigm Shift in TV Advertising," epsilon.com, Jun. 24, 2004, 2 pages, http://www.epsilon.com/who-pr_tvad040624.html.

Experian and AGS Select SRC to Deliver Complete Marketing Solutions; Partnership First to Marketplace with Census2000 Data. PR Newswire. New York: Mar. 21, 2001. p. 1.

"Experian Launches Portfolio Monitor—Owner NoticesSM", News Release, Feb. 2003, Costa Mesa, CA.

(56) References Cited

OTHER PUBLICATIONS

Fanelli, Marc, "Building a Holistic Customer View", MultiChannel Merchant, Jun. 26, 2006, pp. 2.
Findermind, "PeopleFinders Review", as archived Jun. 1, 2012 in 4 pages. http://web.archive.org/web/20120601010134/http://www.findermind.com/tag/peoplefinders-review/.
Frontporch, "Ad Networks-Partner with Front Porch!," www.frontporch.com printed Apr. 2008 in 2 pages.
Frontporch, "New Free Revenue for Broadband ISPs!", http://www.frontporch.com/html/bt/FPBroadbandISPs.pdf printed May 28, 2008 in 2 pages.
"FTC Testifies: Identity Theft on the Rise", FTC News Release, Mar. 7, 2000, pp. 3.
Georges, et al., "KDD'99 Competition: Knowledge Discovery Contest", SAS Institute, 1999, 6 pages.
Gilje, Shelby, "Keeping Tabs on Businesses That Keep Tabs on Us", NewsRoom, The Seattle Times, Section: SCENE, Apr. 19, 1995, pp. 4.
Gonul, et al., "Optimal Mailing of Catalogs: A New Methodology Using Estimable Structural Dynamic Programming Models", 14 pages, Management Science, vol. 44, No. 9, Sep. 1998.
Halliday, Jean, "Ford Recruits Accenture for Marketing Plan," Automotive News Feb. 13, 2006, 2 pages, Crain Communications.
Hartfeil, Guenther, "Bank One Measures Profitability of Customers, Not Just Products," Journal of Retail Banking Services, Aug. 1996, vol. 18, No. 2, pp. 23-29.
Haughton et al., "Direct Marketing Modeling with CART and CHAID", Journal of Direct Marketing, Fall 1997, vol. 11, No. 4, pp. 42-52.
Helm, Burt, "Nielsen's New Ratings Yardstick," businessweek.com, Jun. 20, 2006, 3 pages, http://www.businessweek.com/technology/content/jun2006/tc20060620_054223.htm.
Hill, Kerry, "Identity Theft Your Social Security Number Provides Avenue for Thieves", NewsRoom, Wisconsin State Journal, Sep. 13, 1998, pp. 4.
Hinman, Donald P., "The Perfect Storm: Response Metrics and Digital TV," chiefmarketer.com, May 17, 2006, 2 pages, http://www.chiefmarketer.com/crm_loop/roi/perfect-storm-051706/index.html.
Information Resources, Inc. and Navic Networks Form Joint Relationship to Support Next Generation of Technology for Advertising Testing, IRI Expands BehaviorScan® Solution to Meet Digital and On-demand Needs, Feb. 27, 2006, http://us.infores.com/page/news/pr/pr_archive?mode=single&pr_id=117, printed Oct. 4, 2007 in 2 pages.
"Intelligent Miner Applications Guide", IBM Corp., Apr. 2, 1999, Chapters 4-7, pp. 33-132.
"IRI and Acxiom Introduce More Efficient and Actionable Approach to Consumer Segmentation and Targeted Marketing," eu-marketingportal.de, Jan. 26, 2006, 2 pages, http://www.eu-marketingportal.de.
Jost, Allen; Neural Networks, Credit World, Mar./Apr. 1993, vol. 81, No. 4, pp. 26-33.
Karlan et al., "Observing Unobservables:Identifying Information Asymmetries with a Consumer Credit Field Experiment", Jun. 17, 2006, pp. 58, http://aida.econ.yale.edu/karlan/papers/ObservingUnobservables.KarlanZinman.pdf.
Lamons, Bob, "Be Smart: Offer Inquiry Qualification Services," Marketing News, ABI/Inform Global, Nov. 6, 1995, vol. 29, No. 23, pp. 13.
LeadVerifier: Why Should You Use LeadVerifier?, downloaded from www.leadverifier.com/LeadVerifier_Why.asp, dated Feb. 7, 2006 on www.archive.org.
Leskovec, Jure, "Social Media Analytics: Tracking, Modeling and Predicting the Flow of Information through Networks", WWW 2011-Tutorial, Mar. 28-Apr. 1, 2011, Hyderabad, India, pp. 277-278.
LifeLock, http://web.archive.org/web/20110724011010/http://www.lifelock.com/? as archived Jul. 24, 2011 in 1 page.
Littwin, Angela, "Beyond Usury: A Study of Credit-Card Use and Preference Among Low-Income Consumers", Texas Law Review, vol. 86, No. 3, pp. 451-506; Feb. 2008.
Longo, Tracey, "Managing Money: Your Family Finances", Kiplinger's Personal Finance Magazine, Jun. 1, 1995, vol. 49, No. 6, pp. 4.
Loshin, Intelligent Enterprise: Better Insight for Business Decisions, "Value-Added Data: Merge Ahead", Feb. 9, 2000, vol. 3, No. 3, 5 pages.
McManus et al.; "Street Wiser," American Demographics; ABI/Inform Global; Jul./Aug. 2003; 25, 6; pp. 32-35.
McNamara, Paul, "Start-up's pitch: The Envelope, please," Network World, Apr. 28, 1997, vol. 14, No. 17, p. 33.
"Mediamark Research Inc. Releases Findings From Mobile Marketing Consumer Study; Outback Steakhouse and Royal Caribbean Cruise Lines Among Brands Participating in Mobile Marketing Research," www.thefreelibrary.com, May 9, 2006, 4 pages.
Morrissey, Brian, "Aim High: Ad Targeting Moves to the Next Level", ADWEEK, dated Jan. 21, 2008 as downloaded from http://www.adweek.com/aw/magazine/article_display.isp?vnu on Apr. 16, 2008.
Muus, et al., "A Decision Theoretic Framework for Profit Maximization in Direct Marketing", Sep. 1996, pp. 20.
NebuAd, "Venture Capital: What's New—The Latest on Technology Deals From Dow Jones VentureWire", Press Release, http://www.nebuad.com/company/media_coverage/media_10_22_07.php, Oct. 22, 2007, pp. 2.
"New Privista Product Provides Early Warning System to Combat Identity Theft", PR Newswire, Oct. 24, 2000, PR Newswire Association, Inc., New York.
Otter, et al., "Direct Mail Selection by Joint Modeling of the Probability and Quantity of Response", Jun. 1997, pp. 14.
Polatoglu et al., "Theory and Methodology, Probability Distributions of Cost, Revenue and Profit over a Warranty Cycle", European Journal of Operational Research, Jul. 1998, vol. 108, Issue 1, pp. 170-183.
"PostX to Present at Internet Showcase", PR Newswire, Apr. 28, 1997, pp. 2.
PostX, "PostX® Envelope and ActiveView", http://web.archive.org/web/19970714203719/http://www.postx.com/priducts_fm.html, Jul. 14, 1997 (retrieved Nov. 7, 2013) in 2 pages.
PR Web: Press Release Newswire, Anchor Launches LeadVerifier to Verify, Correct and Enhance Internet Leads, Jul. 19, 2005, pp. 2 pages, Farmingdale, NY.
Predictive Behavioral Targeting http://www.predictive-behavioral-targeting.com/index.php.Main_Page as printed Mar. 28, 2008 in 4 pages.
PrivacyGuard, http://web.archive.org/web/20110728114049/http://www.privacyguard.com/ as archived Jul. 28, 2011 in 1 page.
Punj et al., "Cluster Analysis in Marketing Research: Review and Suggestions for Application," Journal of Marketing Research, May 1983, vol. 20, No. 2, pp. 134-148.
Reinbach, Andrew; MCIF aids banks in CRA Compliance, Bank Systems & Technology, Aug. 1995, vol. vol. 32, Issue No. 8, pp. pp. 27.
Rossi et al.; "The Value of Purchasing History Data in Target Marketing"; Marketing Science, Apr. 1996, vol. 15, No. 4, pp. 321-340.
Schmittlein et al., "Customer Base Analysis: An Industrial Purchase Process Application", Marketing Science, vol. 13, No. 1, Winter 1994, pp. 41-67.
Smith, Richard M., "The Web Bug FAQ", Nov. 11, 1999, Version 1.0, pp. 4.
"SRC Announces Free Dashups to Mashups Adding Geographic Business Intelligence at Web Speed to the Enterprise on www.FreeDemographics.com/API," directionsmag.com, Jun. 12, 2006, 3 pages, http://www.directionsmag.com/press.releases/index.php?duty=Show&id=1.
"SRC Delivers Industry's First Drive Time Engine Developed to Follow Actual Road Networks," thomasnet.com, May 21, 2006, 4 pages, http://news.thomasnet.com/companystory/485722.
Stein, Benchmarking Default Prediction Models: Pitfalls and Remedies in Model Validation, Moody's KMV, Revised Jun. 13, 2002, Technical Report #020305; New York.

(56) References Cited

OTHER PUBLICATIONS

Sweat, Jeff; "Know Your Customers," Information Week, Nov. 30, 1998, pp. 20.
Tao, Lixin, "Shifting Paradigms with the Application Service Provider Model"; Concordia University, IEEE, Oct. 2001, Canada.
TARGUSinfo: Lead Verification, Verify Your Leads With Unique Accuracy and Ease, downloaded from www.targusinfo.com/solutions/verify/Default.asp, as printed Aug. 1, 2006.
TARGUSinfo: Solutions: Services: Verify Express—Verify, Correct and Enhance Customer Provided Data, downloaded from http://web.archive.org/web/20051028122545/http://www.targusinfo.com/solutions/services/verify/, Oct. 28, 2005, as printed Apr. 30, 2011, 27 pgs.
Thoemmes, Felix, "Propensity Score Matching in SPSS", Center for Educational Science and Psychology, University of Tübingen, Jan. 2012.
UPI, "Nielsen Media Research goes electronic," Jun. 14, 2006, 1 page.
"VOD Integration Now Available in Strata: Buyers / Sellers Benefit from VOD Component on Popular Platform," stratag.com, Feb. 21, 2006, 1 page, http://www.stratag.com/news/mediapress022106.html.
Warshaw, Paul R., "A New Model for Predicting Behavioral Intentions: An Alternative to Fishbein", Journal of Marketing Research, May 1980, vol. XVII, pp. 153-172.
Webber, Richard, "The Relative Power of Geodemographics vis a vis Person and Household Level Demographic Variables as Discriminators of Consumer Behavior," CASA:Working Paper Series, http://www.casa.ucl.ac.uk/working_papers/paper84.pdf, Oct. 2004, pp. 17.
White, Ron, "How Computers Work", Millennium Edition, Que Corporation, Indianapolis, IN, Sep. 1999, pp. 284.
Whitney, Daisy; Atlas Positioning to Shoulder VOD Ads; Campaign Management Tools Optimize Inventory, TelevisionWeek, May 23, 2005, 3 pages.
Wyner, "Customer valuation: Linking behavior and economics", Aug. 1996, Marketing Research: A Magazine of Management & Applications vol. 8, No. 2 pp. 36-38.
Yoon, Chang Woo; "Vicarious Certification and Billing Agent for Web Information Service", High Spped Network Access Section, Electronics and Telecommunications Research Institute, Jan. 21-23, 1998, pp. 344-349.
Yun et al., "An Efficient Clustering Algorithm for Market Basket Data Based on Small Large Ratios," Computer Software and Applications Conference, Oct. 2001, pp. 505-510.
Zen et al., "Value-Added Internet: a Pragmatic TINA-Based Path to the Internet and PSTN Integration", Global Convergence of Telecommunications and Distribute Object Computing, Nov. 17-20, 1997, pp. 10.
Declaration of Paul Clark, DSc. for Inter Partes Review of U.S. Pat. No. 8,504,628 (Symantec Corporation, Petitioner), dated Jan. 15, 2014 in 76 pages.
Exhibit D to Joint Claim Construction Statement, filed in Epsilon Data Management, LLC, No. 2:12-cv-00511-JRG (E.D. Tex.) (combined for pretrial purposes with *RPost Holdings. Inc., et al.* v. *Experian Marketing Solutions. Inc.*, No. 2:12-cv-00513-JRG (E.D. Tex.)) Filed Jan. 14, 2014 in 9 pages.
First Amended Complaint in Civil Action No. 2:12-cv-511-JRG (*Rpost Holdings, Inc. and Rpost Communications Limited* V. *Constant Contact, Inc.; et al.*) filed Feb. 11, 2013 in 14 pages.
First Amended Complaint in Civil Action No. 2:12-cv-511-JRG (*Rpost Holdings, Inc. and Rpost Communications Limited* V. *Epsilon Data Management, LLC.*) filed Sep. 13, 2013 in 9 pages.
First Amended Complaint in Civil Action No. 2:12-cv-513-JRG (*Rpost Holdings, Inc. and Rpost Communications Limited* V. *Experian Marketing Solutions, Inc.*) filed Aug. 30, 2013 in 9 pages.
Petition for Covered Business Method Patent Review in U.S. Pat. No. 8,161,104 (*Experian Marketing Solutions, Inc., Epsilon Data Management, LLC, and Constant Contact, Inc.*, v. *Rpost Communications Limited*) dated Jan. 29, 2014 in 90 pages.
Source Code Appendix attached to U.S. Appl. No. 08/845,722 by Venkatraman et al., Exhibit A, Part 1 & 2, pp. 32.
Official Communication in Canadian Patent Application No. 2,381,349, dated May 17, 2013.
Official Communication in Canadian Patent Application No. 2,381,349, dated Jul. 31, 2014.
International Preliminary Examination Report in International Application No. PCT/US00/21453 dated, Jun. 26, 2001.
International Search Report and Written Opinion for Application No. PCT/US2008/064594, dated Oct. 30, 2008.
International Preliminary Report and Written Opinion in PCT/US2008/064594, dated Dec. 10, 2009.
International Search Report and Written Opinion in PCT/US08/083939, dated Jan. 29, 2009.
International Search Report and Written Opinion for Application No. PCT/US09/60393, dated Dec. 23, 2009.
International Search Report and Written Opinion for Application No. PCT/US2010/034434, dated Jun. 23, 2010.
International Preliminary Report on Patentability for Application No. PCT/US2010/034434, dated Feb. 4, 2014.
International Search Report and Written Opinion for Application No. PCT/US2013/052342, dated Nov. 21, 2013.
International Preliminary Report on Patentability for Application No. PCT/US2013/052342, dated Feb. 5, 2015.
Amo, Tina, "How to Find Out Who Has Lived in Your House Before You", https://web.archive.org/web/20130327090532/http://homeguides.sfgate.com/out-lived-house-before-50576.html as archived Mar. 27, 2013, pp. 2.
International Search Report and Written Opinion for Application No. PCT/US2007/021815, dated Sep. 5, 2008.
U.S. Appl. No. 10/881,436, U.S. Pat. No. 8,346,596, System, Method, and Software for Prediction of Attitudinal and Message Responsiveness, filed Jun. 30, 2004.
U.S. Appl. No. 13/689,425, U.S. Pat. No. 9,471,928, System and Method for Generating Targeted Communications Having Different Content and With Preferences for Communication Media, Channel, Timing, Frequency, and Sequences of Communications, Using an Integrated Data Repository, filed Nov. 29, 2012.
U.S. Appl. No. 15/292,861, 2017/0032393, System, Method, Software and Data Structure for Independent Prediction of Attitudinal and Message Responsiveness, and Preferences for Communication Media, Channel, Timing, Frequency, and Sequences of Communications, Using an Integrated Data Repository, filed Oct. 13, 2016.
U.S. Appl. No. 15/621,142, N/A, System, Method, Software and Data Structure for Independent Prediction of Attitudinal and Message Responsiveness, and Preferences for Communication Media, Channel, Timing, Frequency, and Sequences of Communications, Using an Integrated Data Repository, filed Jun. 13, 2017.
U.S. Appl. No. 13/689,443, 2013/0339087, System, Method, Software and Data Structure for Independent Prediction of Attitudinal and Message Responsiveness, and Preferences for Communication Media, Channel, Timing, Frequency, and Sequences of Communications, Using an Integrated Data Repository, filed Nov. 29, 2012.
U.S. Appl. No. 13/689,465, 2013/0332230, System and Method for Generating Targeted Communications Having Different Content and With Preferences for Communication Media, Channel, Timing, Frequency, and Sequences of Communications, Using an Integrated Data Repository, filed Nov. 29, 2012.
"Case Study: Expanding to Non-Traditional Prescreen Marketing Channels Reduces Company's Cost Per Account Booked", FairIsaac, https://web.archive.org/web/20060428115326/http://www.fairisaac.com/NR/rdonlyres/048FAE87-14B5-4732-970D-BDF20F09EB29/0/MSOSRealTimeCS.pdf, Apr. 2003, pp. 2.
International Search Report and Written Opinion for Application No. PCT/US2017/048265, dated Dec. 5, 2017.
"New FICO score extends lenders' reach to credit-underserved millions", Viewpoints: News, Ideas and Solutions from Fair Isaac, Sep./Oct. 2004 as downloaded from http://www.fairlsaac.com/NR/exeres/F178D009-B47A-444F-BD11-8B4D7D8B3532.frame . . . in 6 pages.

(56) References Cited

OTHER PUBLICATIONS

International Preliminary Report on Patentability in Application No. PCT/US2017/048265, dated Mar. 7, 2019.

\* cited by examiner

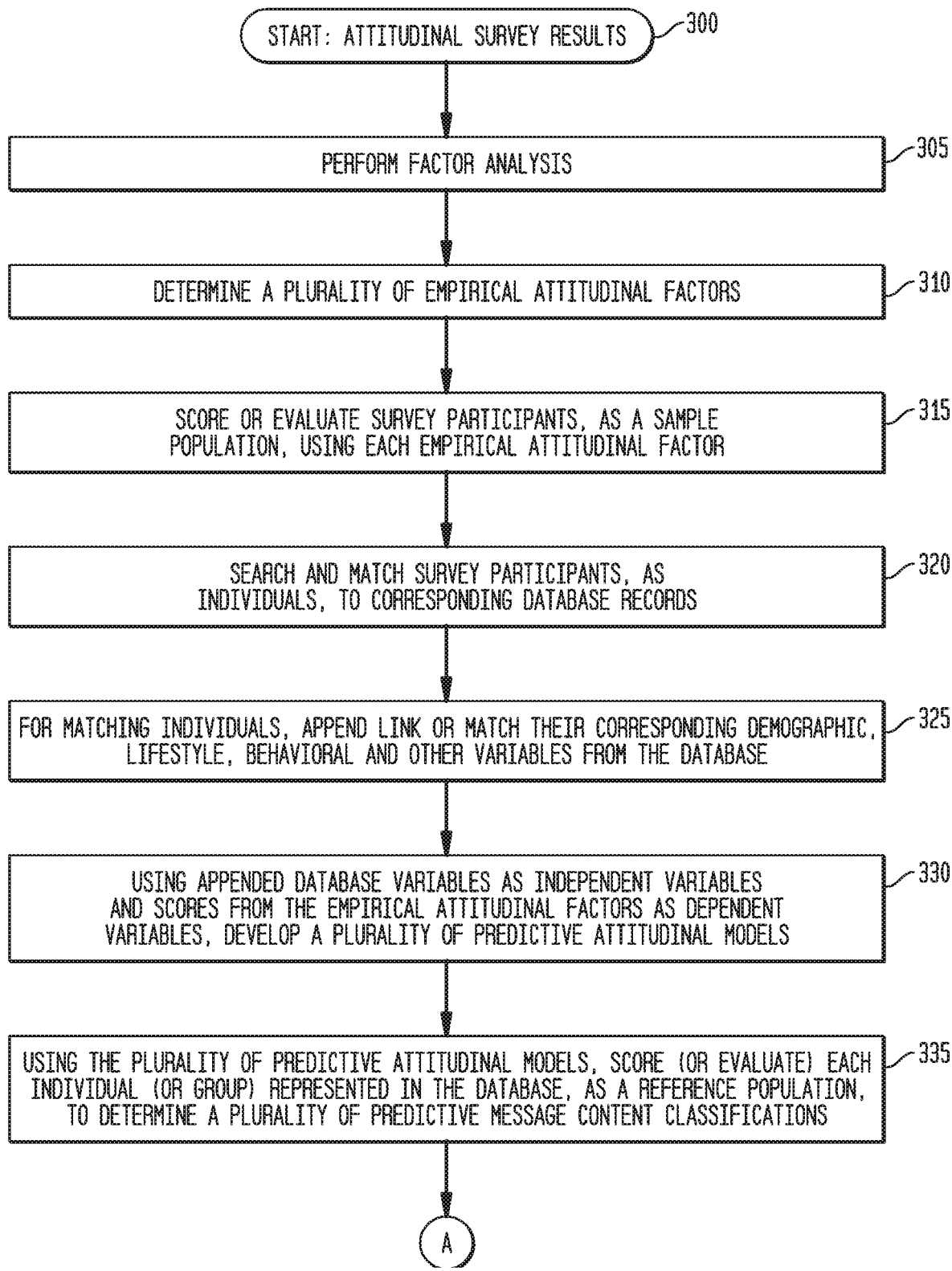

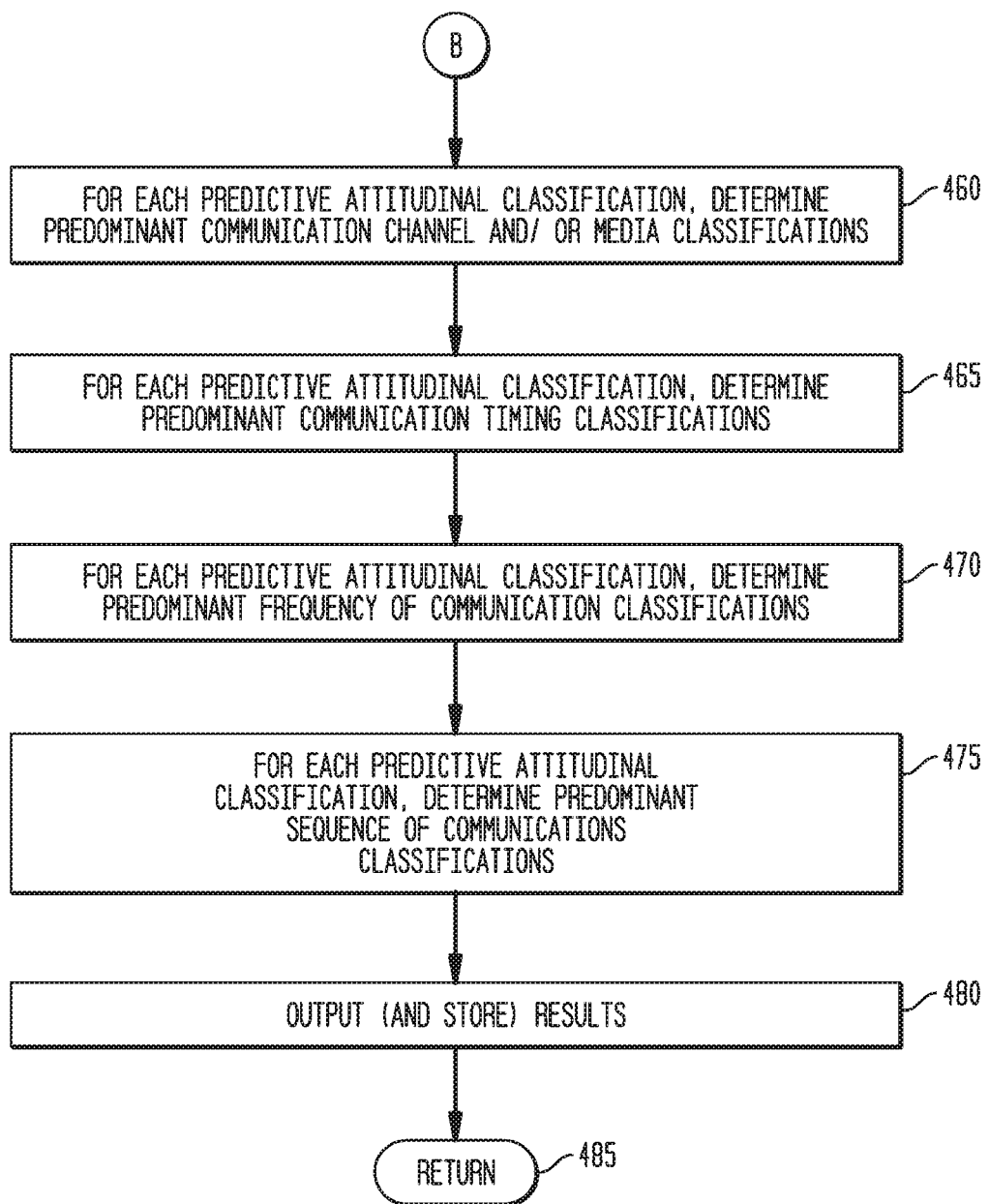

SYSTEM, METHOD, SOFTWARE AND DATA STRUCTURE FOR INDEPENDENT PREDICTION OF ATTITUDINAL AND MESSAGE RESPONSIVENESS, AND PREFERENCES FOR COMMUNICATION MEDIA, CHANNEL, TIMING, FREQUENCY, AND SEQUENCES OF COMMUNICATIONS, USING AN INTEGRATED DATA REPOSITORY

CROSS-REFERENCE TO RELATED APPLICATIONS

This application is a continuation of and claims priority to co-pending U.S. patent application Ser. No. 13/689,425, filed Nov. 29, 2012, titled "System and Method for Generating Targeted Communications Having Different Content and with Preferences for Communication Media, Channel, Timing, Frequency, and Sequences Of Communications, Using An Integrated Data Repository", inventors Marc Christian Fanelli et al., which is a continuation of and claims priority to U.S. patent application Ser. No. 10/881,436, filed Jun. 30, 2004 and issued Jan. 1, 2013 as U.S. Pat. No. 8,346,593, titled "System, Method and Software for Prediction of Attitudinal and Message Responsiveness", inventors Marc Christian Fanelli et al., which are commonly assigned herewith, the entire contents of which are incorporated by reference herein with the same full force and effect as if set forth in their entireties herein, with priority claimed for all commonly disclosed subject matter.

FIELD OF THE INVENTION

The present invention relates, in general, to database management systems and, more particularly, to a system, method and software for independently predicting attitudinal and message responsiveness, and preferences for communication media, channel, timing, frequency, and sequences of communications, using an integrated data repository.

BACKGROUND OF THE INVENTION

Business and consumer records are typically contained in databases and other forms of data repositories. Typical databases may contain records such as demographic data, customer data, marketing data, name and address information, observed and self-reported lifestyle and other behavioral data, consumer data, public record information, realty and property tax information, summarized automotive statistics, summarized financial data, census data, and so on. Virtually any type of information may be contained in any such database. One such highly inclusive database, containing much of the above-mentioned types of data for approximately 98% of U.S. individuals and living units (households), is the Experian INSOUIRCE® database.

Various database applications have been directed to attempts to utilize the wide array of information contained in such databases for marketing and analytical purposes. For example, demographic data may be appended to customer records, to identify the demographic composition of a set of customers, followed by marketing directed toward people having similar demographic characteristics.

These database applications, in their various forms, attempt to understand and access distinct customer and prospect groups, and then send the right message to the right individual, household, living unit or other target audience. Typically, all of the individuals and/or households contained in the corresponding database are segmented into groups which share distinct demographic, lifestyle, and consumer behavior characteristics. In other applications, following such segmentation, consumer attitudes and motivations are assumed and attributed to those individuals/households within each such segment or cluster. The number of segments utilized varies widely by application.

In addition, in these various database marketing applications, consumer attitudes and preferred marketing message themes or types are generally assumed and assigned to a segment, without any independent empirical research and analysis. As a consequence, once a population is segmented, any further analysis of the population based on preferred messaging themes does not, in fact, add any additional, independent information, and merely reiterates the underlying message theme assumptions of any given segment.

The resulting data, moreover, may have a large degree of uncertainty, may or may not be accurate, and may or may not be actionable. For example, the attitudes, motivations and behaviors attributed or assigned to each segment may not be accurate and may not be based on factual, empirical research. Such attitudes, motivations and behaviors may or may not actually reflect representative attitudes found in a particular customer database.

The diminished accuracy of current marketing methods is further underscored by comparatively low response rates, such as 1-2% response from a target audience for direct mail marketing. Other methods and systems are required to appropriately target and motivate the remainder of the target audience, and to determine potentially new and underdeveloped target audiences. In addition, new methods and systems are required to maximize marketing returns, by not overly saturating the target audience with excessive and ineffective communications, and instead to appropriately communicate with the target audience using the audience's preferred methods and times of communication.

As a consequence, a need remains for a predictive methodology and system, for accurate prediction of attitudes, motivations and behaviors, which may be utilized for marketing applications. Such a method and system should be empirically-based, such as based on actual attitudinal, behavioral or demographic research and other information from a population sample, and further should provide accurate modeling to predict and extrapolate such attitudinal or other information to a larger or entire population. Such a method and system should provide information concerning preferred message themes or message content independently from any population grouping, segmentation or clustering process. In addition, such a method and system should be actionable, providing not only audience attitudinal information and preferred message content, but also preferred communication channel information or other preferred communication media, preferred frequency of communication or other contact, and communication timing information.

SUMMARY OF THE INVENTION

The present invention provides a system, method and software for independently predicting a plurality of first, message content classifications and a plurality of second, attitudinal classifications, for a selected population of individuals, households, living units or other groupings of people represented in a data repository, such as a selected population of customers or prospects represented in a database or data files. In addition, the system, method and software of the invention, depending on the selected embodiment, also determine preferences for communication channel or other media forms, communication timing, frequency of communication, and/or sequences of types of communication.

The illustrated, exemplary embodiments of the present invention are empirically-based, using actual attitudinal research and other information from a population sample. Other types of research or data may also be utilized, such as transactional data, demographic data, marketing research data, or other types of survey information. With this empirical basis, the invention provides accurate modeling to predict and extrapolate such attitudinal, behavioral, demographic or other information to a larger reference population, thereby providing for accurate prediction of attitudes, motivations and behaviors, which may be utilized for marketing applications, for example. The exemplary embodiments of the invention further provide information concerning preferred message themes or message content independently from any population grouping, segmentation or clustering process. In addition, the exemplary embodiments of the invention provide actionable results, providing not only audience attitudinal information and preferred message content, but also preferred communication channel information, communication media, communication frequency, and communication timing and sequencing information.

The power of the invention cannot be overstated. As indicated above, prior art methods have focused on finding "who", namely, those individuals or households to whom marketers should direct their communications. None of these prior art methods provide, independently of the selection of "who", determination of the "what" of the communication, such as preferred content or versions of marketing information. None of these prior art methods provide independent information on the "when" of the communication, such as the customer's or prospect's preferred time of day to receive communications. None of these prior art methods provide independent information on the "how" of the communication, such as the customer's or prospect's preferred medium or channel for communication, such as direct mail, telephone, electronic mail (email), broadcast media, print media, and so on. Lastly, none of these prior art methods provide independent information on the frequency (how often) and sequencing (ordering) of the communications, based on preferences, such as print media for a first number of times, followed by direct mail for a second number of times, followed by email, for example.

More specifically, in exemplary embodiments, the present invention provides a method, system and software for independently predicting both a plurality of first predictive classification, referred to as message content classifications, and a plurality of second predictive classifications, referred to as attitudinal or other behavioral classifications, for a selected population of a plurality of individuals, households, living units or other groupings of persons, as "entities", represented in a data repository. As used herein, any reference to "entity" or "entities" should be understood to mean and include any individual, household, living unit, group or potential grouping of one or more people, whether related or unrelated, individually or collectively, however defined or demarcated, such as a household, a living unit, a geographic unit, or any other grouping of individuals for whom or which data may be maintained, generally at a granular or atomic level, in a database.

In the exemplary embodiments, empirical attitudinal research and predictive attitudinal classifications are illustrated as examples, and should be understood to mean and include other forms of research and classifications, such as behavioral or demographic classifications formed from corresponding empirical research, such as corresponding behavioral or demographic survey research, for example.

The various exemplary method, system and software embodiments of the invention, perform the following:
First, for each entity (e.g., individual or household) of the plurality of entities of the selected population, appending from the data repository a corresponding predictive attitudinal classification of a plurality of predictive attitudinal classifications, and a corresponding plurality of predictive message content classifications, with the corresponding predictive attitudinal classification and corresponding plurality of predictive message content classifications having been determined using a plurality of predictive (attitudinal) models developed from a sample population and applied to a reference population represented in the data repository.
Second, for each predictive attitudinal classification of the plurality of predictive attitudinal classifications, determining a penetration index of the selected population compared to the reference population.
Third, for each predictive attitudinal classification of the plurality of predictive attitudinal classifications, independently determining at least one predominant predictive message content classification from the appended plurality of predictive message content classifications of the plurality of individuals of the selected population having the corresponding predictive attitudinal classification of the plurality of predictive attitudinal classifications.

In addition, depending upon the selected embodiment, for each entity (e.g., individual or household) of the plurality of entities of the selected population, the various embodiments optionally provide for appending from the data repository a corresponding predictive communication media (or other channel) classification of a plurality of predictive communication media classifications, a corresponding predictive communication timing classification of a plurality of predictive communication timing classifications, a corresponding predictive frequency of communication classification of a plurality of predictive communication frequency classifications, and a corresponding predictive sequence of communications of a plurality of predictive communication sequence classifications, with these classifications having been determined from information stored in the data repository.

Typically, the plurality of predictive communication media classifications comprises at least two of the following communication media (equivalently referred to as communication channels): electronic mail, internet, direct mail, telecommunication, broadcast media (such as radio, television, cable, satellite), video media, optical media (DVD, CD), print media (such as newspapers, magazines), electronic media (such as web sites and electronic forms of newspapers, magazines), and public display media (such as signage, billboards, multimedia displays). Depending upon the selected embodiment, the plurality of communication media and channel classifications may be more or less specific, such as further subdividing print and electronic media channels into newspaper, weekly magazines, monthly magazines, journals, business reports, and further into their print, internet, email or electronic versions. In addition, various forms of broadcast media may have any of a plurality of forms, such as cable, satellite, television and radio frequency transmission, internet, etc. Also typically, the plurality of predictive communication timing classifications comprises at least two of the following communication timing classifications: morning, afternoon, evening, night, weekday, weekend, any time (no preference), and none. The plurality of predictive communication frequency classifications typically comprises at least two of the following frequency of communication classifications: daily, weekly, biweekly, monthly, semi-monthly, bimonthly, annually, semi-annually, and none. Lastly, the plurality of communication sequences are highly varied and may include, for example, print communications, followed by electronic communications.

In the various embodiments, the plurality of predictive message content classifications are or have been determined by:

first, developing a plurality of empirical attitudinal factors based on a factor analysis of an attitudinal survey of a sample population;

second, using each empirical attitudinal factor of the plurality of empirical attitudinal factors, scoring each participant of the attitudinal survey to create a corresponding plurality of empirical attitudinal factor scores;

third, using a plurality of selected variables from the data repository as independent variables, and using the corresponding plurality of empirical attitudinal factor scores as dependent variables, performing a regression analysis to create the plurality of predictive attitudinal models;

fourth, using each predictive attitudinal model of the plurality of predictive attitudinal models, scoring the plurality of entities represented in the data repository, as the reference population, to create the plurality of predictive message content classifications; and fifth, independently determining the plurality of predictive attitudinal classifications by a cluster analysis of the plurality of predictive message content classifications of each entity of the plurality of entities represented in the data repository.

As indicated above, in lieu of or in addition to the attitudinal research and predictive attitudinal classifications, other types of research and corresponding classifications may also be formed, such as behavioral, demographic, and transactional.

The invention also provides for determining core, niche and growth attitudinal classifications, as follows:

determining one or more core attitudinal classifications by selecting, from the plurality of predictive attitudinal classifications, at least one predictive attitudinal classification having a comparatively greater (e.g., average or above average) penetration index and having a comparatively greater proportion of a selected population;

determining one or more niche attitudinal classifications by selecting, from the plurality of predictive attitudinal classifications, at least one predictive attitudinal classification having a comparatively greater penetration index and having a comparatively lesser proportion of the reference population; and determining one or more growth attitudinal classifications by selecting, from the plurality of predictive attitudinal classifications, at least one predictive attitudinal classification having a comparatively lesser (e.g., below average) penetration index and having a comparatively greater proportion of the reference population.

In yet another aspect of the invention, the exemplary embodiments provide a method and system for independently predicting communication responsiveness of a selected population of a plurality of entities represented in a data repository. The method comprises: (a) for each entity of the plurality of entities of the selected population, appending from the data repository a corresponding predictive identification classification of a plurality of predictive identification classifications, wherein the plurality of predictive identification classifications designate a plurality of entities according to a selected property; (b) for each entity of the plurality of entities of the selected population in a corresponding predictive identification classification, appending at least one corresponding predictive message version classification of a plurality of predictive message version classifications, the plurality of predictive identification classifications and the plurality of predictive message version classifications having been determined from a plurality of predictive models developed from a sample population and applied to a reference population represented in the data repository; and (c) for each predictive identification classification of the plurality of predictive identification classifications, independently determining at least one predominant predictive message version classification from the corresponding, appended predictive message version classifications of the plurality of entities of the selected population of the predictive identification classification. The selected property is derived from at least one of the following: attitudinal characteristics, behavioral characteristics, demographic characteristics, geographic characteristics, financial characteristics, or transactional characteristics.

In yet another aspect of the invention, the exemplary embodiments provide a data structure for independently predicting communication responsiveness of a selected population of a plurality of entities represented in a data repository. Such a data structure may be stored in a database, transmitted electronically, or stored in a tangible medium. The data structure comprises: a first field having a plurality of predictive identification classifications, wherein the plurality of predictive identification classifications designate a plurality of entities according to a selected property; and a second field having, for each predictive identification classification of the first field, at least one predominant predictive message version classification of a plurality of predictive message version classifications, the plurality of predictive identification classifications and the plurality of predictive message version classifications having been determined from a plurality of predictive models developed from a sample population and applied to a reference population represented in the data repository.

The data structure may also include a third field having, for each predictive identification classification of the first field, at least one predominant predictive communication media classification of a plurality of predictive communication media classifications; a fourth field having, for each predictive identification classification of the first field, at least one predominant predictive communication timing classification of a plurality of predictive communication timing classifications; a fifth field having, for each predictive identification classification of the first field, at least one predominant predictive communication frequency classification of a plurality of predictive communication frequency classifications; a sixth field having, for each predictive identification classification of the first field, at least one predominant predictive communication sequencing classification of a plurality of predictive communication sequencing classifications; and a seventh field having a penetration index for each predictive identification classification of the plurality of predictive identification classifications. As indicated above, the selected property is derived from at least one of the following: attitudinal characteristics, behavioral characteristics, demographic characteristics, geographic characteristics, financial characteristics, or transactional characteristics.

In yet another aspect of the invention, the exemplary embodiments provide a method for independently predicting communication media responsiveness of a selected population of a plurality of entities represented in a data repository, comprising: (a) for each entity of the plurality of entities of the selected population, appending from the data repository a corresponding predictive identification classification of a plurality of predictive identification classifications, wherein the plurality of predictive identification classifications designate a plurality of entities according to a selected property; and (b) for each predictive identification classification of the plurality of predictive identification classifications, independently determining at least one predominant predictive communication media classification of a plurality of predictive communication media classifications.

In other embodiments, instead of step (b) above, the exemplary method provides for each predictive identification classification of the plurality of predictive identification classifications, independently determining at least one predominant predictive communication timing classification of a plurality of predictive communication timing classifications, or for independently determining at least one predominant predictive communication frequency classification of a plurality of predictive communication frequency classifications.

These and additional embodiments are discussed in greater detail below. Numerous other advantages and features of the present invention will become readily apparent from the following detailed description of the invention and the embodiments thereof, from the claims and from the accompanying drawings.

BRIEF DESCRIPTION OF THE DRAWINGS

The objects, features and advantages of the present invention will be more readily appreciated upon reference to the following disclosure when considered in conjunction with the accompanying drawings and examples which form a portion of the specification, in which.

DETAILED DESCRIPTION OF THE INVENTION

Figure 1:
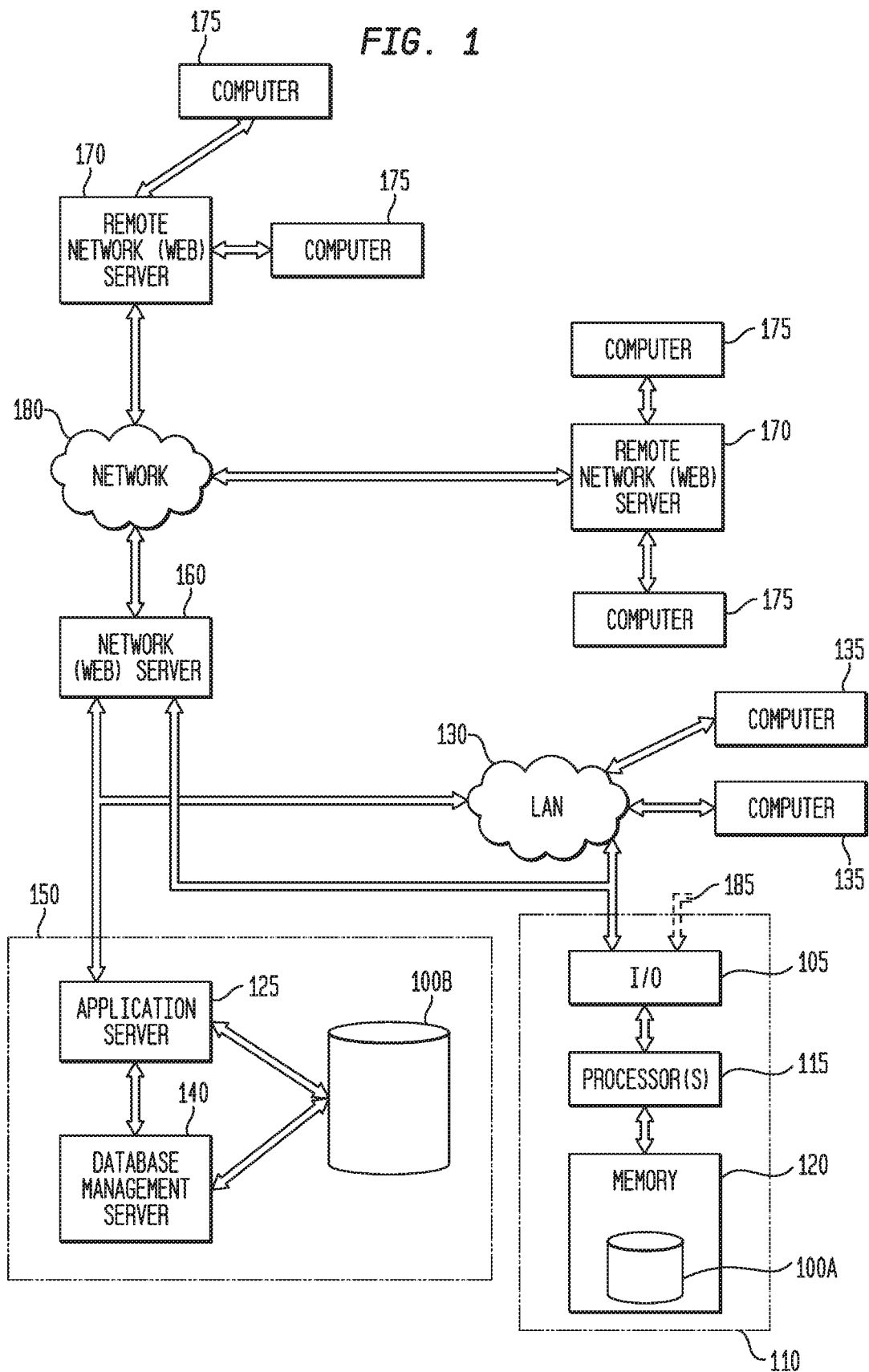
FIG. 1 is a block diagram illustrating first and second exemplary system embodiments in accordance with the present invention.

While the present invention is susceptible of embodiment in many different forms, there are shown in the drawings and will be described herein in detail specific examples and embodiments thereof, with the understanding that the present disclosure is to be considered as an exemplification of the principles of the invention and is not intended to limit the invention to the specific examples and embodiments illustrated.

As indicated above, the present invention provides a system, method and software for independently predicting a plurality of attitudinal classifications and a plurality of message content classifications, for a selected population of individuals, households or other living units ("entities") represented in a data repository, such as a database. The embodiments of the present invention provide a predictive methodology, system and software, for accurate prediction of attitudes, motivations and behaviors, which may be utilized for marketing, research, assessment, and other applications. The embodiments of the invention are empirically-based upon actual attitudinal research and other information from a population sample, and provide accurate modeling to predict and extrapolate such attitudinal information to a larger reference population. The embodiments of the invention further provide information concerning preferred message themes or message content independently from any population grouping, segmentation or clustering process. In addition, the embodiments of the invention provide actionable results, providing not only audience attitudinal information and preferred message content, but also preferred communication and media channel information, communication frequency, and communication timing and sequence information.

FIG. 1 is a block diagram illustrating first exemplary system embodiment 110 and second exemplary system embodiment 150 in accordance with the present invention. As illustrated in FIG. 1, the first exemplary system embodiment 110 is a computer system embodiment (e.g., a mainframe computer), comprising an input and output (I/O) interface 105, one or more processors 115, and a memory 120 storing a database (or data repository) 100A. The memory 120 may be external, such as an external magnetic disk, tape, or optical drive. The second system 150, such as an open or network system, comprises a data repository (or database) 100B (also embodied in a form of memory, discussed below), a database management server 140, and/or an application server 125. A "data repository", "database", and "data warehouse", as used herein, are considered interchangeable, and may be relational, object-oriented, object-relational, or use files or flat files, or any combinations of the above. Both database 100A and 100B are instantiations of a database 100, discussed in greater detail below.

In the exemplary embodiments of system 150, the database management server 140 and the application server 125 may be implemented together, such as implemented within the application server 125. Either or both of the database management server 140 and the application server 125 are connected or coupled (or couplable) to the data repository (database) 100B, for full duplex communication, such as for database queries, database file or record transfers, database updates, and other forms of database communication. In the second system embodiment 150, the database management server 140 and/or the application server 125 perform the methodology of the invention utilizing a correspondingly programmed or configured processor as discussed below (not separately illustrated), such as a processor 115 illustrated for system 110, in conjunction with a database 100 (such as database 100B).

Typically, the databases 100A and 100B are ODBC-compliant (Open Database Connectivity), although this is not required for the present invention. The first system 110 and second system 150 may also be coupled to or may be part of a local area network ("LAN") 130 or, not separately illustrated, a wide area network ("WAN"), such as for full duplex communication with a plurality of computers (or other terminals) 135, also for database queries, database file or record transfers, database updates, and other forms of database communication. The LAN 130 communication capability provides for the first system 110 and second system 150 to be accessible for local access to the databases 100A and 100B, such as for large file transfers or other batch processing, discussed in greater detail below. In addition, the first system 110 may also be directly accessible (185), such as for loading of records (e.g., magnetic tape records or other media) for batch processing.

The first system 110 and second system 150 may also be included within or coupled to a larger data communication network 180, through network (or web) server 160, for full duplex communication with remote devices, such as a remote Internet or other network server 170 and remote computer (or other terminal) 175. Such remote communication capability provides for the first system 110 and second system 150 to be accessible for on-line functionality, discussed in greater detail below, such as for web-based access, using any of the prior art protocols, such as hypertext transfer protocol (HTTP) or other Internet Protocol ("IP") forms of communication for data, voice or multimedia.

The data repository (or database) 100, illustrated as databases 100A and 100B, may be embodied in any number of forms, including within any data storage medium, memory device or other storage device, such as a magnetic hard drive, an optical drive, a magnetic disk or tape drive, other machine-readable storage or memory media such as a floppy disk, a CDROM, a CD-RW, DVD or other optical memory, a memory integrated circuit ("IC"), or memory portion of an integrated circuit (such as the resident memory within a processor IC), including without limitation RAM, FLASH, DRAM, SRAM, MRAM, FeRAM, ROM, EPROM or $E^2$PROM, or any other type of memory, storage medium, or data storage apparatus or circuit, which is known or which becomes known, depending upon the selected embodiment.

In the first system 110, the I/O interface may be implemented as known or may become known in the art. The first system 110 and second system 150 further include one or more processors, such as processor 115 illustrated for first system 110. As the term processor is used herein, these implementations may include use of a single integrated circuit ("IC"), or may include use of a plurality of integrated circuits or other components connected, arranged or grouped together, such as microprocessors, digital signal processors ("DSPs"), custom ICs, application specific integrated circuits ("ASICs"), field programmable gate arrays ("FPGAs"), adaptive computing ICs, associated memory (such as RAM and ROM), and other ICs and components. As a consequence, as used herein, the term processor should be understood to equivalently mean and include a single IC, or arrangement of custom ICs, ASICs, processors, microprocessors, controllers, FPGAs, adaptive computing ICs, or some other grouping of integrated circuits which perform the functions discussed below, with associated memory, such as microprocessor memory or additional RAM, DRAM, SRAM, MRAM, ROM, EPROM or $E^2$PROM. A processor (such as processor 115), with its associated memory, may be adapted or configured (via programming, FPGA interconnection, or hard-wiring) to perform the methodology of the invention, as discussed above and as further discussed below. For example, the methodology may be programmed and stored, in a processor with its associated memory (and/or memory 120) and other equivalent components, as a set of program instructions (or equivalent configuration or other program) for subsequent execution when the processor is operative (i.e., powered on and functioning). Equivalently, when the first system 110 and second system 150 may implemented in whole or part as FPGAs, custom ICs and/or ASICs, the FPGAs, custom ICs or ASICs also may be designed, configured and/or hard-wired to implement the methodology of the invention. For example, the first system 110 and second system 150 may implemented as an arrangement of microprocessors, DSPs and/or ASICs, collectively referred to as a "processor", which are respectively programmed, designed, adapted or configured to implement the methodology of the invention, in conjunction with a database 100.

The application server 125, database management server 140, and the system 110 may be implemented using any form of server, computer or other computational device as known or may become known in the art, such as a server or other computing device having a processor, microprocessor, controller, digital signal processor ("DSP"), adaptive computing circuit, or other integrated circuit programmed or configured to perform the methodology of the present invention, such as a processor 115, as discussed in greater detail below.

Figure 2:
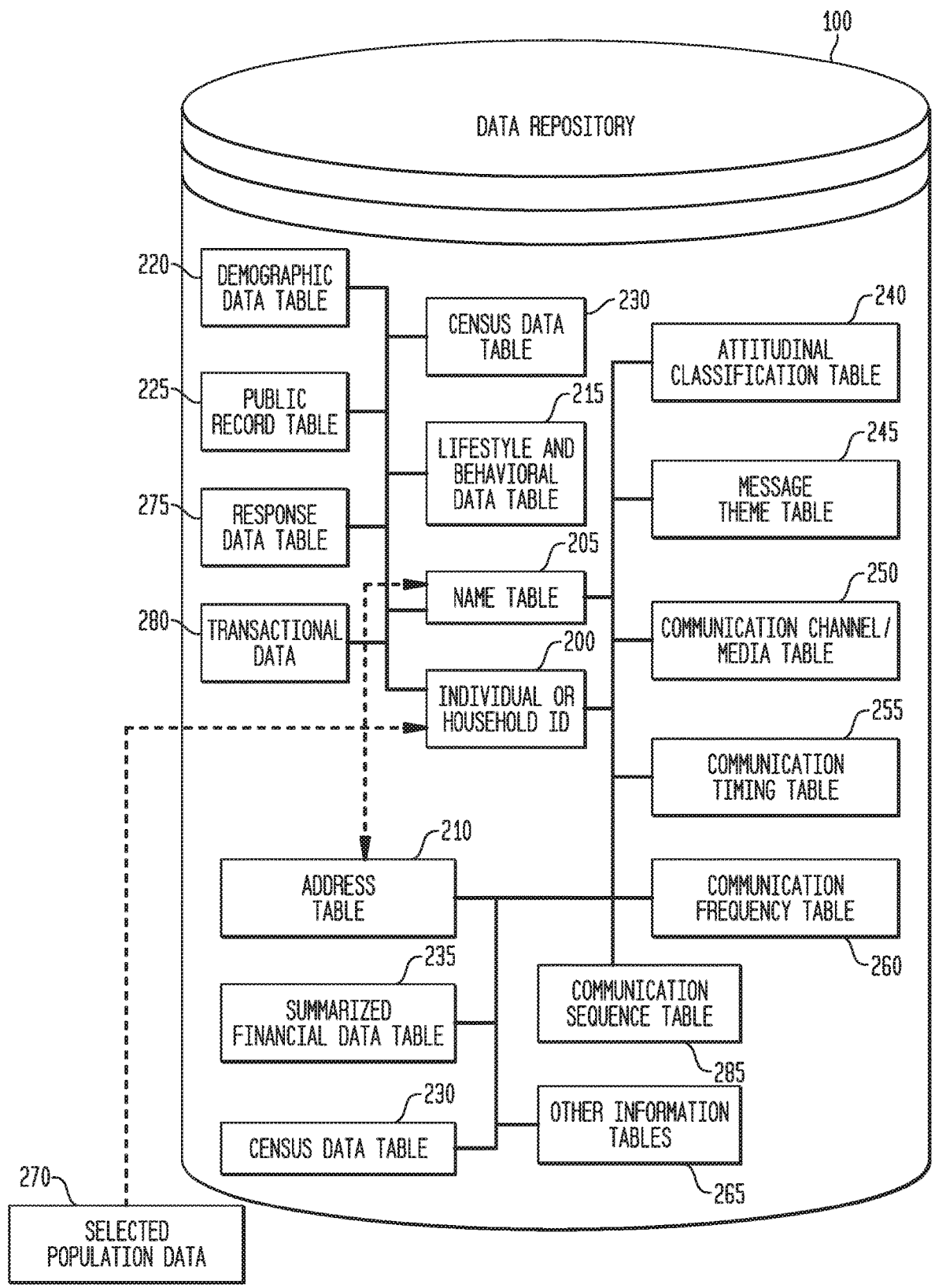
FIG. 2 is a block diagram illustrating an exemplary integrated data repository in accordance with the present invention.

FIG. 2 is a block diagram illustrating an exemplary data repository (or database) 100 in accordance with the present invention. As mentioned above, "data repository" as used herein, is considered interchangeable with "database", and may be relational, object-oriented, or object-relational, or utilize any other database structure, in accordance with a selected embodiment. The database 100 may be integrated, namely, that the information resides within a singular, co-located or otherwise centralized database structure or schema, or may be a distributed database, with information distributed between and among a plurality of databases, some of which may be remotely located from the other databases. From another point of view, the database 100 may be considered integrated in that a plurality of different tables or types of tables, objects or relations are included within the database 100, such as including an attitudinal classification table 240 with the other illustrated tables discussed below. While generally not included within the database 100 (as potentially private client data), optionally one or more copies of a selected population data (file, table or database) 270, such as a client customer databases, client customer flat files, or client master databases, may also be utilized. (Use of any type of data repository, whether an integrated database, a non-integrated database, or any otherwise distributed or non-distributed database structures or schemas, are within the scope of the present invention. While referred to as tables, it should be understood that the tables illustrated in the database 100 of FIG. 2 are to be construed broadly, to mean and include relations, objects, object relations, multi-dimensional relations, cubes, flat files, or other similar or equivalent database constructs.) In addition, while a plurality of relations (or connections) between and among the various tables are illustrated in FIG. 2, it should be understood that in any selected embodiment, a greater or fewer number of relations, connections, cross-references, keys, or indices may be utilized, all within the scope of the present invention.

The database 100 generally includes, for example, a name table 205, an address table 210, a lifestyle and behavioral data table 215, and a demographic data table 220, and depending upon the selected embodiment, may also include a public record table 225, a census data table 230, a summarized financial data table 235, and other information tables 265. In various embodiments, the name table 205 and address table 210 may be combined as a single table. In the exemplary embodiments, the database 100 further includes an attitudinal (or behavioral) classification table 240, a message theme table 245, a communication media (or channel) table 250, a communication timing table 255, a communication frequency table 260, a communication sequence table 285, a response data table 275, and a transactional data table 280, as discussed in greater detail below. While illustrated as separate tables or relations, it should be understood that the information contained in such tables may be contained or distributed between or among any number of tables or relations, depending upon any applicable or selected schema or other database 100 structure, in any number of equivalent ways, any and all of which being within the scope of the present invention. The data repository 100 is generally included within a first system 110 and/or second system 150, and respectively accessed through the I/O 105 and processor 115, or an application server 125 or database management server 140, discussed above.

The name table 205 contains all individual, consumer, household, living unit, group or other entity names, in various forms, variations, abbreviations, and so on, and is also utilized for searching and matching processes, as discussed below. The address table 210 contains all addresses of individuals, households, living units, groups or other entities which will be utilized for searching and matching processes, as discussed below. In the exemplary embodiment, the lifestyle and behavioral data table 215 contains lifestyle and behavioral information for individuals, households, living units, or other groups or consumers, as "entities", such as purchase behavior, activity data, and any self-reported data. The demographic data table 220 contains demographic information and possibly geodemographic information for consumers and other individuals, households, living units, or other entities, such as age, gender, race, religion, household composition, income levels, career choice, etc. The public record table 225 contains information available in public records, such as vehicle ownership records, driving records, property ownership records, public proceeding records, secured transaction records, and so on. The census data table 230 contains census information, typically available through a government agency. The summarized financial data table 235, when included in database 100, typically includes summaries of financial information generally for individuals or households in a given geographic region (e.g., by postal code), and could possibly also include bank account information, investment information, securities information, and credit or other private information, when available and to the extent allowable under any applicable regulations or laws.

The transactional data table 280 typically contains information concerning purchase history or other transaction history of the various entities. The response data table 275 contains information typically related to transactional data, such as for purchases made in response to a particular communications, such as in response to a catalogue, direct mail, or a magazine advertisement. The transactional data table 280 and the response data table 275, for example, may be based upon data from particular clients or groups of clients. The information contained in the lifestyle and behavioral data table 215, the demographic data table 220, the public record table 225, the census data table 230, and the summarized financial data table 235, other information tables 265, and any other available tables, depending upon the selected embodiment, are utilized in the creation of independent variables for the predictive attitudinal (or behavioral) modeling discussed below. The selected population data 270, which may be in any of various forms such as a table, a file, a flat file, a relation, a database, or another data schema, such as a copy of a selected customer database, contains names or names and addresses of individuals, households, living units, other groups or entities, such as customers or any other selected or designated population, and is utilized to provide predictive attitudinal marketing information for the selected population, as discussed in greater detail below. Also optionally included within database 100 are other information tables 265, such as for other demographic information, credit information, and fraud information, when available or authorized.

The attitudinal classification table 240, the message theme table 245, the communication channel table 250, the communication timing table 255, the communication frequency table 260, and the communication sequence table 285, are generally created, populated or segregated based upon the predictive attitudinal (or behavioral) modeling discussed below with reference to FIG. 3.

Depending upon the selected database 100 embodiment, a table or index (relation or look-up table) 200 of identifiers or identifications ("IDs") of a plurality of individuals, consumers, households, living units, other groups or entities, may be included within the database 100. The identifiers are typically persistent, with every entity assigned at least one ID. In the exemplary embodiments, the ID table 200 also provides relations, links or cross-references to a plurality of other relations or tables, such as, for example, the name table 205, the address table 210, the lifestyle and behavioral data table 215, the demographic data table 220, the public record table 225, the census data table 230, the summarized financial data table 235, the attitudinal classification table 240, the message theme table 245, the communication channel table 250, the communication timing table 255, the communication frequency table 260, the communication sequence table 285, and the other information tables 265. The ID table 200 may also provide relations, links or cross-references to selected population data (file, table or database) 270, depending upon the selected embodiment and the form of the data. The ID table 200 may be utilized in the searching and matching processes discussed below, and for other database applications, such as updating.

Figure 3B:
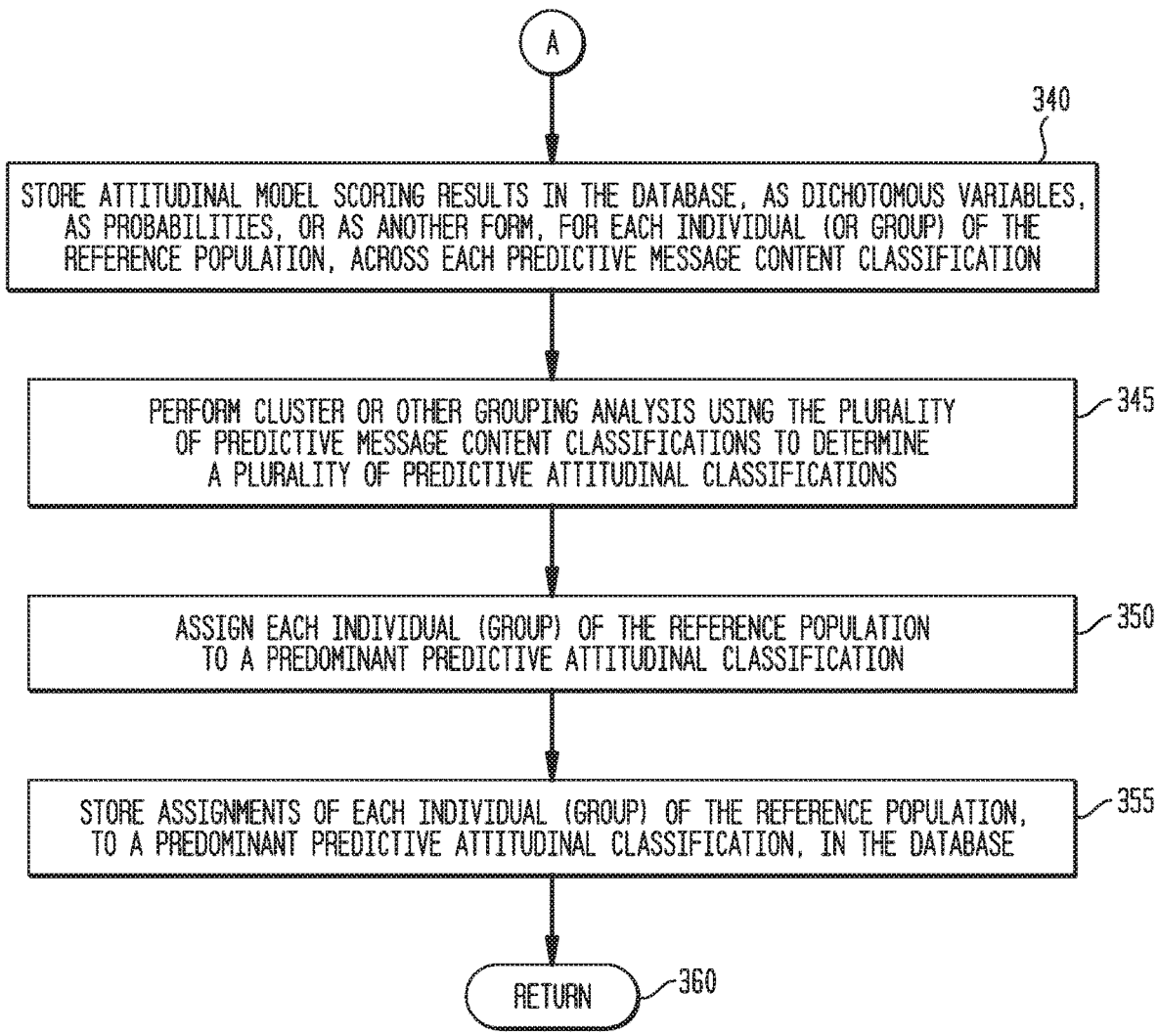
FIG. 3 (divided into FIGS. 3A and 3B and collectively referred to as FIG. 3), is a flow diagram illustrating an exemplary method for determination of predictive attitudinal classifications and predictive message content classifications using a data repository in accordance with the present invention.

FIG. 3 is a flow diagram illustrating an exemplary method for determination of first predictive (attitudinal) classifications and second predictive (message content) classifications using a data repository in accordance with the present invention. As indicated above, in accordance with the exemplary embodiments, such first predictive classifications are attitudinal and derived using empirical attitudinal research; in other embodiments, the first predictive classifications may be behavioral, demographic, or any combination thereof, and derived from corresponding empirical research, such as behavioral or demographic survey research. The second predictive classifications are determined independently, and in the exemplary embodiments, provide message content or message theme classifications, which are subsequently utilized to determine the "what" of a marketing or educational communication, for example.

The method begins, start step 300, with results of one or more attitudinal (or behavioral) surveys of individuals, as consumers or as members of a living unit (household). As mentioned above, as used herein, "entity" or "entities" should be understood to mean and include any individual person, household, living unit, group or potential grouping of one or more people, whether related or unrelated, individually or collectively, such as a single individual, a household, a living unit, a geographic unit, or any other grouping of individuals for which data may be maintained, generally at a granular or atomic level in a database. For example, various databases may be maintained in which information is stored and available at an individual level, for individual persons and, in many cases, also maintained at a less granular level of living units (households), while in other cases, also within the scope of the present invention, information may be stored and available in a database only at a household level, with the predicted attitudinal and messaging classifications then pertaining to corresponding households (as a larger grouping of one or more individuals). In other cases, an individual residing at a first location may also be considered to be part of a living unit at a second location, such as a student residing in a college dormitory being considered part of a family household residing at a different location. All such variations are within the scope of the present invention and, for ease of reference, any references to an entity or entities means and includes any individual, person, or grouping or collection of persons, however such a grouping may be defined or demarcated.

In the exemplary embodiments, an empirical modeling process is performed in which selected questions from a survey are utilized for obtaining information pertinent to consumer purchasing, behaviors, and attitudes (which also may be considered to include various behavioral and demographic components). Survey questions, data and results are available from a wide variety of vendors, publications, and other sources. Survey questions may also be determined based upon the goals of the modeling and classification processes. The survey may be conducted and results obtained in any of various forms, such as via telephone, written survey, email survey, mail survey, internet survey, personal interview, etc. The selected questions from the survey are then subjected to a factor analysis, step 305, to statistically determine which questions are highly related to or among other survey questions, to what degree, and to isolate the significant questions and determine corresponding factors, step 510, with a selected group of highly related survey questions forming a selected, corresponding factor. This factor analysis may also be an iterative process in selected embodiments. The resulting plurality of empirical attitudinal factors identify attitudes, behaviors and motivations of the survey participants, and identify the significant corresponding survey questions. The plurality of empirical attitudinal factors which are selected depend upon the selected purposes of the classifications discussed below, such as marketing analyses, for example, and are also dependent upon the selected purposes of the survey (as are the resulting attitudinal and message content classifications, discussed below), and the cultural, sociological, demographic, and other characteristics of the sample population of the survey.

In an exemplary embodiment, a plurality of empirical attitudinal factors were developed as a result of the factor analysis and empirical attitudinal model determinations of steps 305 and 310. Exemplary factors for marketing purposes include, for example, consumer brand loyalty, impulse buying behavior, incentive driven behavior, and so on. Innumerable other factors and corresponding questions will be apparent to those of skill in the art, for other behavioral or demographic modeling, for example. Corresponding exemplary statements are illustrated below, to which a sample population was asked to agree or disagree, on a varying scale, from highly agree, somewhat agree, neutral, somewhat disagree, and highly disagree, resulting in an equivalent question format. The sample questions are exemplary, for purposes of illustration only, and any resulting set of attitudinal, behavioral or demographic models (discussed below) will be empirically determined based upon the purpose of the research survey, the selected survey questions and results, the survey population and culture, followed by factor analysis. Additional survey questions may also be utilized to expand the attitudinal factors utilized. Exemplary statements, utilized in a representative survey of the present invention, include, for example:

If a product is made by a company I trust, I'll buy it even if it is slightly more expensive.

I am willing to pay more for a product that is environmentally safe.

I like to shop around before making a purchase.

I'm always one of the first of my friends to try new products or services.

I prefer products that offer the latest in new technology.

If I really want something I will buy it on credit rather than wait.

I'd rather receive a sample of a product than a price-off coupon.

Following development of the plurality of empirical attitudinal factors of steps 305 and 310, all of the survey participants, as a sample population, are scored across each of the empirical attitudinal factors, step 315. For example, various survey participants may have indicated various levels of agreement (or disagreement) with the survey questions of a particular attitudinal factor, and as such, would be scored high (or low) for that particular attitudinal factor. The scoring process may also be computed in probabilistic terms, as a probability of exhibiting a particular attitude. As a consequence, in the exemplary embodiment, each survey participant was scored across the plurality of empirical attitudinal factors. Also for example, various survey participants may have similar scores across a plurality of empirical attitudinal factors, such as high scores for the same first factor, and low scores for the same second factor.

Following scoring of the survey participants across each of the empirical (attitudinal) factors in step 315, records in the database 100 pertaining to the survey participants, as individuals (or entities such as living units), are searched, and the survey participants are matched with their corresponding records within the database 100, step 320, generally utilizing the name table 205 and address table 210. For all entities such as individuals, households, living units, or other groups having matching records (i.e., matching individuals/households), demographic, lifestyle, behavioral, and other variables (from the database 100) are appended or linked to each (matching) survey participant, step 325, such as variables from the lifestyle and behavioral data table 215, the demographic data table 220, the public record table 225, the census data table 230, the summarized financial data table 235, the transactional data table 280, and the response data table 275, for example. In the exemplary embodiment, the Experian INSOURCE® database, as previously described, was utilized as the database 100. Using the appended database variables as independent variables, and using the empirical attitudinal factor scores as dependent variables, a predictive attitudinal model (or, equivalently, an attitudinally predictive model) is developed for each empirical attitudinal factor, step 330, thereby generating a corresponding plurality of predictive attitudinal models, one for each empirical attitudinal factor. In the exemplary embodiment, a logistic regression analysis is performed, to identify the database variables (as independent variables) which are statistically significant predictors of the attitude of the corresponding empirical attitudinal factor. Other statistical methods, such as multiple linear regression analysis, other forms of regression analysis, and other forms of modeling and statistical analysis, are also considered equivalent and within the scope of the present invention. Selection of given database variables is also a function of the availability of such variables within the database 100, namely, any given database may or may not include variables available in other databases. Not separately illustrated in step 330, the plurality of attitudinally predictive models may also be validated, such as by using a "holdout" (or separate) sample from the survey results.

Using the plurality of predictive attitudinal models of step 330, all or most database entities (or members), namely, all or most individuals, consumers, households, living units, or other groups contained in the database (i.e., contained in the database by having representative information in the database 100), are scored (or otherwise evaluated) across each of the plurality of predictive attitudinal models, step 335. Having been scored/evaluated, these entities (e.g., individuals or households) then form a reference population, utilized for comparative purposes discussed below. The results from each such entity (individual or group) being scored or evaluated based on each of the predictive attitudinal models, in step 335, then form or represent (or otherwise generate or determine) a corresponding plurality of predictive message content classifications, also referred to as predictive message theme classifications, for each such entity (individual or group) represented in the database 100. More specifically, using the plurality of predictive attitudinal models, each entity (individual, household, living unit, or other group) represented in the database 100 is predicted to have a corresponding probability of belonging in or to a classification associated with a particular attitude/behavior/demographic of interest, in which entities (individuals, households, living units, or other groups) exhibiting that attitude/behavior/demographic are generally responsive, receptive, attentive, conducive to or motivated by messages or other communications having a particular content or theme. Such content or themes, for example, to which individuals or groups may be receptive, may be matched, correlated or derived from various information sources, such as information contained in the lifestyle and behavioral data table 215, the response data table 275, and the transactional data table 280. As a consequence, the results from the evaluations using the predictive attitude/behavior/demographic models provide or form the corresponding predictive message content classifications for each entity (individual, household, living unit, or other group) of the reference population.

These classifications are referred to as predictive message content classifications (or message theme classifications) because, as discussed below, they are utilized to predict the message content or message themes to which individuals, households, living units, or other groups within that classification are likely to be receptive or responsive. As indicated above, the actual result of the scoring may be a probability of exhibiting the attitude in question, or may be a number or percentile which can be equivalently translated into such a probability. In the exemplary embodiment, the probability scores were further classified into nine tiers, which were then further utilized to create dichotomous variables in order to classify the entity (individual or group) as either exhibiting the attitude of interest or not exhibiting the attitude of interest. For each such entity (individual or group), the results of step 335, namely, the scores for each of the predictive attitudinal models and/or each of the resulting predictive message content classifications, are stored in the database, step 340, such as in message theme table or relation 245.

For example, using the scores or evaluations from the plurality of predictive attitudinal models for individual (or group) "A", records may be stored indicating that "A" has a high probability level of belonging to predictive message content classifications "X", "Y", and "Z", and a low probability level of belonging to each of the remaining predictive message content classifications. Alternatively and equivalently, records for individual (or group) "A" may be stored indicating that "A" has certain scores from the evaluations under each of the predictive attitudinal models, and belongs to predictive message content classifications "X", "Y", and "Z" (with dichotomous variables of "1"), and does not belong to each of the remaining predictive message content classifications (with dichotomous variables of "0"). As a consequence, depending upon the selected embodiment, all or most entities represented in the database 100 have associated scores for each of the plurality of predictive attitudinal models and, correspondingly, a membership (or no membership), or a degree or probability of membership, in each of the corresponding plurality of predictive message content (or theme) classifications.

It should be noted that in the exemplary embodiments, the empirical attitudinal factors and predictive message content classifications have a one-to-one correspondence, and may be very similar. In other embodiments, there may be more or fewer predictive message content classifications compared to empirical attitudinal factors. As indicated above, the empirical attitudinal factors are based on the factor analysis of the survey questions from the sample population and are utilized to develop the predictive attitude/behavior/demographic models incorporating the database variables. The predictive attitude/behavior/demographic models derived from the empirical analysis of the sample population are then extended into the database population, as the reference population. The results from this predictive modeling are then matched or correlated with other database information to create the corresponding predictive message content classifications. In addition, given the appended database variables, various demographic, lifestyle and behavioral characteristics may also be included in or as part of the descriptions of the predictive message content (or theme) classifications.

In the exemplary embodiments, a plurality of representative, predictive message content (or message theme) classifications were developed as a result of the analysis of step 335. Several examples of predictive message content classifications are illustrated below, with corresponding, exemplary message content guidelines. It will be understood in the art that these predictive message content classifications are exemplary and for purposes of illustration and not limitation, and that any resulting set of predictive message content classifications will be empirically determined based upon the selected survey purposes; the selected survey questions and results; the survey or sample population, demographics, socioeconomics and culture; the plurality of predictive attitudinal models; and the extrapolated database population.

Exemplary Predictive Message Content (or Theme) Classifications:

First Exemplary Predictive Message Content (or Theme) Classification: Exemplary message content guidelines include rewarding and complimenting for being the first to take advantage of new products and services, highlighting new or cutting edge products or offers, and demonstrating the prestige of the product/service offered.

Second Exemplary Predictive Message Content (or Theme) Classification: Exemplary message content guidelines include communicating the strength and quality of a brand, the importance of relationships and customer service, emphasizing the quality of a product, emphasizing the number of years in business, and integrity and quality awards.

Third Exemplary Predictive Message Content (or Theme) Classification: Exemplary message content guidelines include a family focus, bonuses, presenting how a product/offer is better than a competitive product/service, price comparison, and value features.

Fourth Exemplary Predictive Message Content (or Theme) Classification: Exemplary message content guidelines include appealing to altruism, activism, and appreciation for our ecology, the use of natural ingredients, and emphasis on quality with details.

Fifth Exemplary Predictive Message Content (or Theme) Classification: Exemplary message content guidelines include use of celebrity endorsements and testimonials to emphasize image and style, and use of incentive gifts.

Sixth Exemplary Predictive Message Content (or Theme) Classification: Exemplary message content guidelines include demonstrating a fair value using a straightforward, logical approach, a masculine emphasis, and use of peer/user comparisons and testimonials.

Referring again to FIG. 3, following scoring of all or most entities (individuals or groups) in the database 100 using the plurality of predictive attitudinal models, concomitant assignment of membership (or non-membership) of the entities (individuals or groups) to the corresponding plurality of predictive message content classifications in step 335, and storing the resulting information in the database 100 of step 340, the exemplary method of the invention performs a cluster or grouping analysis of all such database members (entities) using either (or both) the corresponding scores from each of the plurality of predictive attitudinal models or the resulting assigned membership(s) (or probability of membership(s)) in the predictive message content classifications, step 345. This cluster or grouping analysis of step 345 not only utilizes the plurality of predictive message content classifications (and/or predictive attitudinal models), but also utilizes combinations of the various predictive message content classifications (or, equivalently, scores from the corresponding predictive attitudinal models). Any form of cluster or grouping analysis may be utilized, as known or may become known in the field. The result of this cluster or grouping analysis is a plurality of predictive attitudinal classifications. For example, those entities that belong or are assigned to the same two predictive message content classifications, or equivalently those entities that scored high in the same two corresponding predictive attitudinal models, may be clustered or grouped together into a first predictive attitudinal classification. Also for example, those entities who belong in one predictive message content classifications and who do not belong in another predictive message content classification may be clustered or grouped together into a second predictive attitudinal classification. In addition, clusters may exist for those who belong in only one predictive message content classification.

For example, for the plurality of predictive attitudinal classifications described below: a first exemplary cluster exhibited both a "trend following" attitude and an "impulsive" attitude, but not an "incentive driven" attitude; and a second exemplary cluster exhibited an "environmentally conscious" attitude, a "brand loyal" attitude, and a "buy American" attitude, but not a "price conscious" attitude.

As a result of the cluster (segmentation or grouping) analysis of step 345, a plurality of predictive attitudinal classifications are developed, generally having a greater number of classifications than the plurality of predictive message content classifications, and providing higher granularity or discrimination among the various attitudes/behaviors/demographics exhibited among the database reference population. In the exemplary embodiments, using membership or non-membership in the plurality of predictive message content classifications (based on probability scores from the predictive attitudinal models), clusters were identified where the mean value of the dichotomous variable was 0.70 or higher, indicating a segment that had at least one strong loading.

Following the cluster analysis, in step 350, each entity (individual or group) represented in the database is assigned to a predominant predictive attitudinal (behavioral or demographic) classification, of the plurality of predictive attitudinal (behavioral or demographic) classifications, based upon his, her or its highest probability of exhibiting the attitude(s) (behaviors or demographics) of interest of the corresponding classification. This assignment may be determined equivalently by the entity's scores from the predictive attitudinal models and/or the correspondingly determined memberships in one or more predictive message content classifications. For example, individuals or groups predicted to exhibit only a single attitude of interest would be assigned to that corresponding predictive attitudinal classification (or cluster), while those exhibiting more than one attitude of interest would be assigned to a corresponding predictive attitudinal classification, as a cluster of those particular of attitudes. In the exemplary embodiment, those entities (using dichotomous variables or "all or none" scores for the predictive attitudinal models) not assigned as described above are then re-clustered to identify an optimal segment or cluster, which may not meet stricter scoring requirements, but nonetheless indicate a predominant, predictive attitudinal classification. Also in the exemplary embodiments, an entity is assigned to one and only one predictive attitudinal classification; in other embodiments, multiple predictive attitudinal/behavioral/demographic classifications may be assigned.

As is the case with the scores from the plurality of predictive attitudinal models and the corresponding assignments to the plurality of predictive message content classifications, such assignments of predictive attitudinal classifications are also stored in the database 100, step 355, such as in attitudinal classification table or relation 240. As a consequence, all or most entities represented in the database 100, in accordance with the present invention, have a plurality of records stored in the database 100, namely: (1) either or both the associated scores (results) for each of the plurality of predictive attitudinal models and/or, correspondingly and equivalently, a membership (or no membership) or a degree or probability of membership in the corresponding plurality of predictive message content (or theme) classifications (message theme table 245); and (2) an assignment into a predominant, predictive attitudinal classification (attitudinal classification table 240). Following step 355, the method of determination of predictive attitudinal classifications and predictive message content classifications using a data repository, in accordance with the present invention, may end, return step 360.

In the exemplary embodiment, a plurality of predictive attitudinal classifications were developed as a result of the analysis of step 345, and representative examples are illustrated immediately below. For each such exemplary predictive attitudinal classification, corresponding marketing strategies, lifestyle and interests, demographics, behaviors and attitudes, and socioeconomic indicators are illustrated, generally derived from corresponding database variables and other information available in a database 100, as well as syndicated survey research. It will be understood in the art that these predictive attitudinal classifications and their marketing names are exemplary and for purposes of illustration and not limitation, and that any resulting set of predictive attitudinal classifications will be empirically determined based upon the selected survey questions and results; the survey population, demographics, socioeconomics and culture; the plurality of predictive attitudinal models; the extrapolated database population; and the selected cluster analysis.

Exemplary Predictive Attitudinal (or Behavioral) Classifications:

First Exemplary Predictive Attitudinal (or Behavioral) Classification: Individuals and households in this first predictive attitudinal classification stay true to themselves and the brands that they prefer. They are selective with their purchases, and look for well-established products and services that have demonstrated quality and value. Individuals and households in this first predictive attitudinal classification are responsive to brand extensions and use coupons on the products that they already have an affinity toward. From the database 100, their lifestyle and interests include enjoyment of reading and visits to bookstores; television viewing and preferring informative programming and movie classics; investing wisely and often; maintaining an exercise and fitness regimen; and participation in activities such as golf, tennis, fishing, and occasional gambling. Also from the database 100, their demographics include being established mid-lifers; married, divorced or single; any children are grown and have left home; they typically own their own homes, and have established residences, usually in larger, affluent cities. The behaviors and attitudes of the individuals and households in this first predictive attitudinal classification include being ardent catalog shoppers; having a preference for outdoor lifestyle companies; shopping at upscale retail stores; preferring "the real thing" to generic products; visiting the grocery store frequently with a likelihood of using coupons to save on preferred brands; and enjoyment of domestic and overseas travel. Their socioeconomic indicators include a high income; an above average home value; established credit experience with a well-maintained, stable credit history; an undergraduate degree and some graduate studies; occupations including finance, accounting, engineering and real estate; and they drive luxury vehicles.

Second Exemplary Predictive Attitudinal (or Behavioral) Classification: Individuals and households in this second predictive attitudinal classification represent a highly affluent, successful and stable consumer market, containing established old-wealth and the nouveau riche. Their investments and dividends are as impressive as their incomes. They aspire to own and use the finest quality brands and services, and they are willing to pay the extra dollar for the privilege of living this lifestyle. They enjoy traveling quite extensively, so incentives that provided added benefit in this area are preferable. The active lifestyles they lead drive them to utilize all modes of convenient communication. The lifestyle and interests of individuals and households in this second predictive attitudinal classification include a love to travel domestically and overseas, preferring cruises and tours; shopping at mid-level to upscale stores; diverse sports interests and may be avid golfers; socially involved as club members, theatre and concert-goers, and with environmental causes. Their demographics include a wide age range, from young to mature adults; largest concentration is established and mid-life adults, who are typically married; their children range in age from grade school to high school; they typically own their own homes, having well-established residences, usually in comfortable and prosperous neighborhoods, in major and mid-size cities, and in urban city settings. The behaviors and attitudes of the individuals and households in this second predictive attitudinal classification include "working to live" rather than "living to work"; they are active, affluent, have an influential lifestyle and are financially astute; they make time for family and individual interests, and want the "good life" for their family; they are technology- and internet-savvy, with frequent web accessing. The socioeconomic indicators include a high income; an above average home value; extensive, established and good credit experience; they have an undergraduate degree with some graduate studies; their occupations include finance, engineering, healthcare, counseling, computer/technology and marketing; they are more likely to lease vehicles than to buy; drive new and used import cars and light trucks, and are drawn to near-luxury, luxury, specialty and SUV models.

Third Exemplary Predictive Attitudinal (or Behavioral) Classification: Individuals and households in this third predictive attitudinal classification are dedicated sports fans that enjoy a wide variety of outdoor pursuits—from do-it-yourself home improvement projects to scuba diving, and they enjoy their lifestyle. Their independence may make it a challenge to establish relationships with these customers, and they prefer product samples to coupons to provide immediate proof of the product's quality and immediate savings. Their lifestyle and interests include being outdoor enthusiasts; they have no preference for brand name goods over generic brands; they are dedicated sports fans, they enjoy working on mechanics, home improvement, boating, motorcycles, scuba diving and video games. The demographics of individuals and households in this third predictive attitudinal classification include mainly being young adults, who are single or divorced, with low indications of children present in the household; they typically rent instead of own residences, and live in apartments rather than single-family homes, with a wide variety of residential settings, often transient or in rural towns. Individuals and households in this third predictive attitudinal classification have behaviors and attitudes such as liking things to be simple and straightforward, "rough and rugged", and self-determining. Socioeconomic indicators of individuals and households in this third predictive attitudinal classification include a below average income; a slightly below average home value; a newer credit experience with average extension; varied education levels; typically employed in service- and consumer-oriented industries and/or may be students; they typically drive used, domestic vehicles, and models include small to mid-size cars and small- and full-size pickup trucks.

Fourth Exemplary Predictive Attitudinal (or Behavioral) Classification: Individuals and households in this fourth predictive attitudinal classification are conservative, content with the status quo and not easily swayed. They focus on "hearth and home" for comfort and entertainment, avidly donate to the causes they support, and enjoy timeless activities such as leisure sports, musical performances, gardening, and reading. As consumers, they are motivated to spend money on their families, homes and hobbies but are careful to spend it well, making them highly responsive to coupons and discount offers. Their lifestyle and interests include family-oriented, domestic activities such as home improvement projects, gardening, cooking and entertaining. They are typically passionate donors that support causes such as religious, political and health issues. They are also devoted book and magazine lovers and sports enthusiasts. The demographics of the individuals and households in this fourth predictive attitudinal classification are that they are mainly seniors and retirees, typically married, whose children have left home (empty nesters). They typically own their own homes, usually multi-dwelling units rather than single-family homes, and prefer to live in rural towns and small city communities. The behaviors and attitudes of the individuals and households in this fourth predictive attitudinal classification include a relaxed living attitude, with a healthy standard of living, deriving significant pleasure from daily activities with family and friends. They make the most of their spending and utilize coupons. They like to keep up on interests in music, trivia and collectibles. Socioeconomic indicators for this classification include a low income, with an average to below average home value; stable, consistent and capable credit experience; they are typically high school graduates with some college; and primarily are retired. They typically drive domestic used vehicles that include mid-range cars and pick-up trucks The plurality of predictive attitudinal classifications and plurality of predictive message content classifications, with additional information available in a database 100 as discussed below, become extraordinarily powerful tools when applied to a selected population, such as a group of individuals represented in a customer database, a prospect database, a client database, a membership database, an association database, and so on. In the exemplary embodiment, the additional information available in the database 100 includes, for all or most of the represented (or matched) individuals, households, living units or other entities: their preferred methods of communication and/or communication media (communication media table 250), their preferred times (time of day) of communications (communication timing table 255), their preferred frequencies of communication (communication frequency table 260), and their preferred sequences of communication (communication sequence table 285). This additional information may be determined in a wide variety of ways, including self-reported preferences and behaviors, third-party reported preferences and behaviors (such as transactions, purchases, and activities), observed preferences and behaviors, and inferred preferences and behaviors based on modeled data.

Figure 4A:
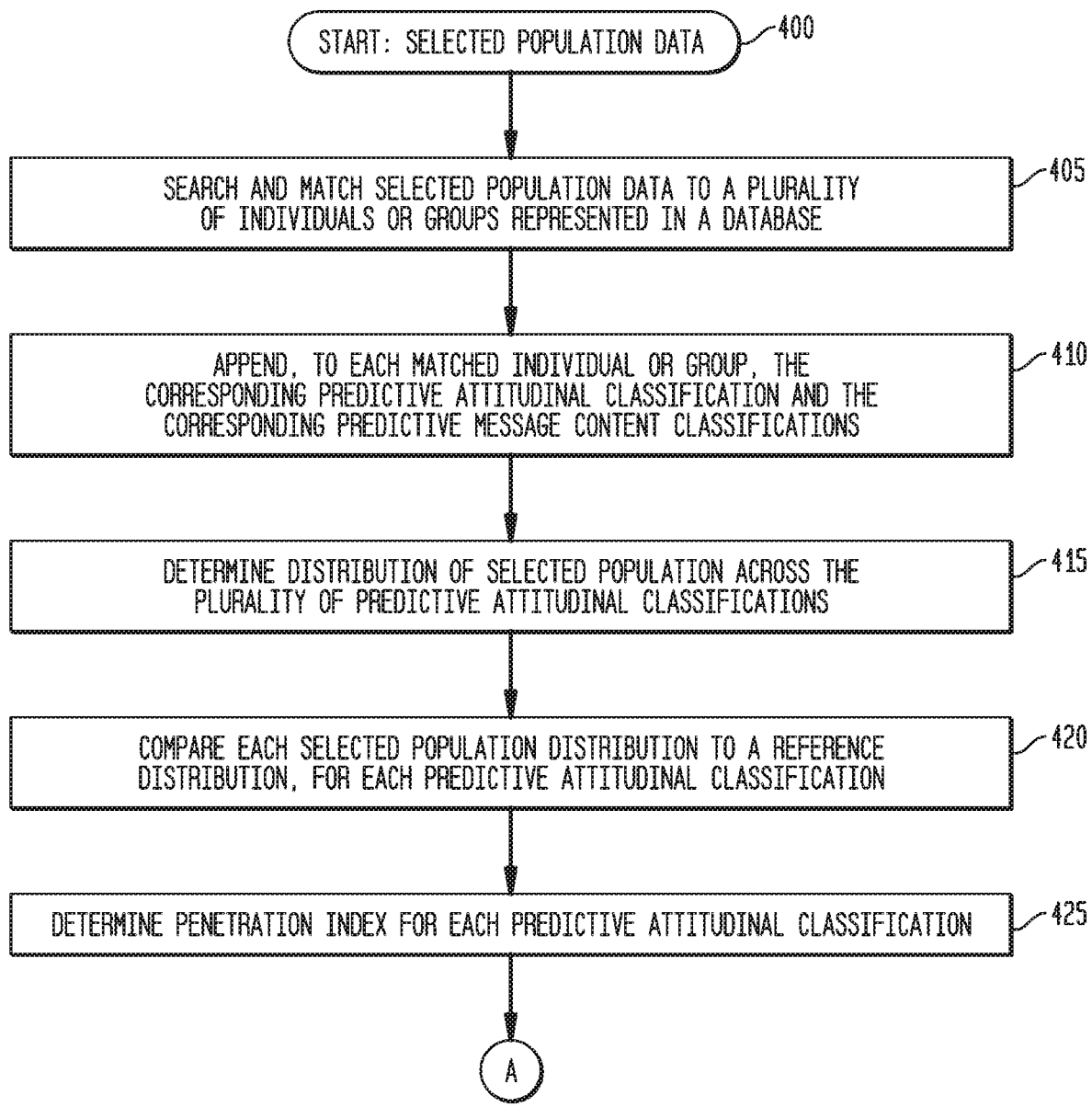
FIG. 4 (divided into FIGS. 4A, 4B and 4C and collectively referred to as FIG. 4), is a flow diagram illustrating an exemplary method of independently predicting a plurality of attitudinal classifications, a plurality of message content classifications, and other predictive information, of a selected population using a data repository in accordance with the present invention.
Figure 4B:
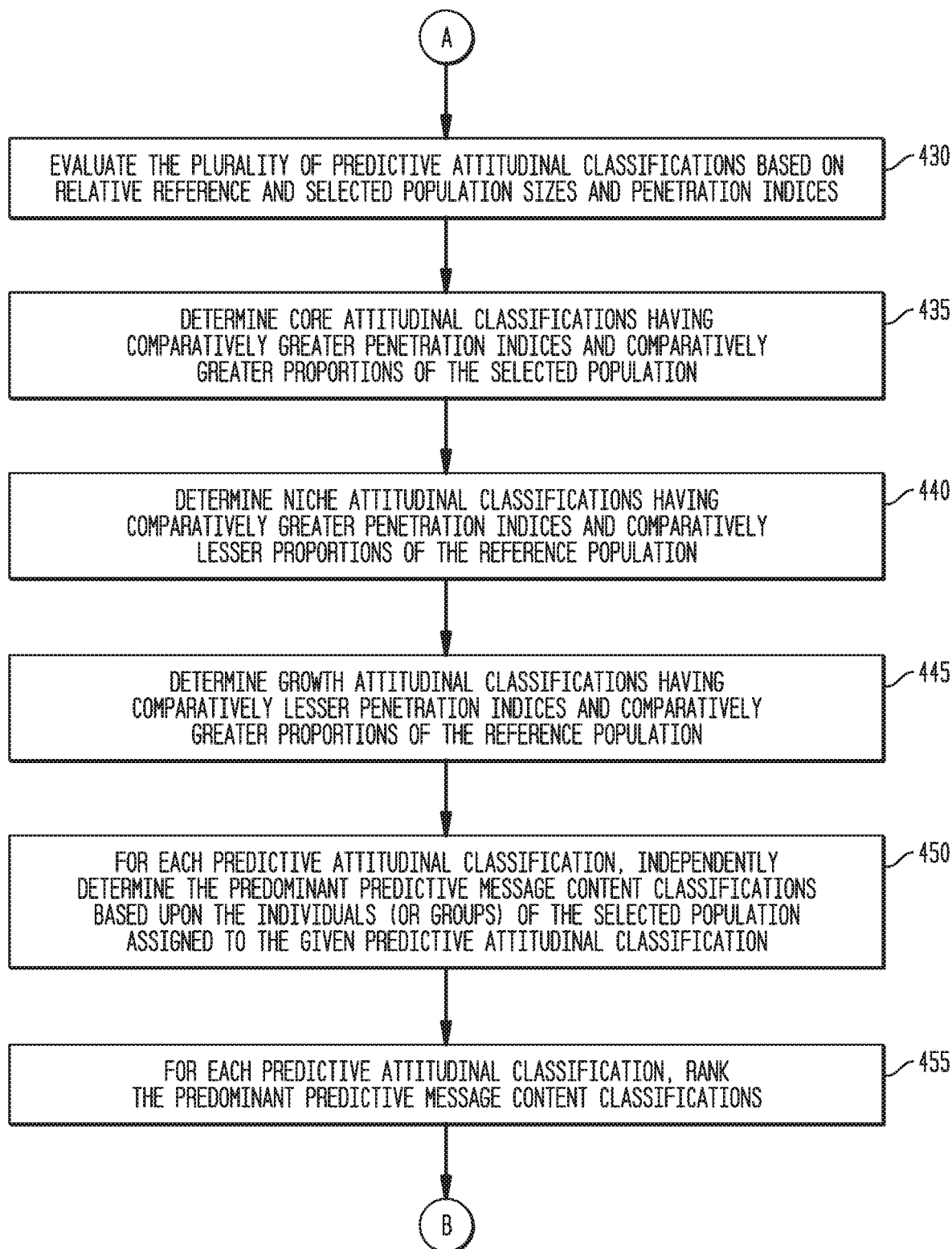

FIG. 4 is a flow diagram illustrating an exemplary method of independently predicting a plurality of attitudinal classifications and a plurality of message content classifications of a selected population in accordance with the present invention. In addition, depending upon the selected embodiment, predicted communication and/or media channels, predicted communication timing, predicted communication frequency, and predicted communication sequencing, may also be provided as part of the method illustrated with reference to FIG. 4.

Referring to FIG. 4, the method begins, start step 400, with data about or concerning a selected population, such as name and/or name and address information from a customer database or file, a customer prospect file or list, or any other identifying data or information of or for a group of individuals, households, living units, groups or other entities, for any selected purpose. The database 100 is then searched and the selected population data is matched with the records of the database 100, step 405, such as matched with the records of the INSOURCE® database. For all records where a match is found in step 405, the method appends, references or links, to each (matched) entity of the selected population, their corresponding (i.e., predominant) predictive attitudinal classification, and their corresponding predictive message content classification(s), step 410. As discussed above, for each such entity, their corresponding predictive attitudinal classification is generally their predominant attitudinal classification of the plurality of predictive attitudinal classifications, and their corresponding predictive message content classifications are generally their memberships or probabilities of membership in each of the plurality of predictive message content classifications. In the exemplary embodiments, optionally as part of step 410, the method also appends, references or links the entity's associated information concerning predicted communication and media channels, predicted communication timing, predicted communication frequency, and predicted communication sequence.

There are a wide variety of alternatives or defaults for non-matching entities of step 405, including variations depending upon degrees or levels of matching. Exemplary alternatives include, for non-matching individuals or groups, appending and utilizing the average, most common or mode classifications for a particular geographic region, such as a postal code area. Another alternative includes excluding those non-matching individuals or groups from the remainder of the method and, equivalently, the selected population may be considered to be comprised of the matching entities from step 405. Those of skill in the art will recognize that the matching step 405 and the appending step 410 may be performed in a plurality of ways, including use of conditional loops or iterations, with each iteration corresponding to the matching and appending for a given entity, and with iterations continuing until all entities have been matched (or found to not match) and corresponding data appended.

The method then determines the distribution of the selected population across or within each of the predictive attitudinal classifications, to form a corresponding plurality of selected population distributions, step 415. Each selected population distribution is compared to a reference distribution for each of the predictive attitudinal classifications, step 420. Typically, a reference or baseline distribution is or may be the distribution, across or within each of the predictive attitudinal classifications, of the larger, often national or regional population represented in the database 100, referred to above as the reference population. For example, for a selected population, such as the purchasers of a particular automobile brand, when compared to a larger regional or national population on a proportional or percentage basis, that selected population may be comparatively or relatively over-represented in certain predictive attitudinal classifications, and that selected population may be comparatively or relatively under-represented in other predictive attitudinal classifications.

Based on these comparisons of the distribution of the selected population with a reference distribution, for each predictive attitudinal classification of the plurality of predictive attitudinal classifications, a "penetration" or comparative index (or rate) is determined, step 425, with a comparatively greater or higher penetration index indicative of a higher proportional concentration of entities of the selected population within a given predictive attitudinal classification compared to the reference distribution, and with a comparatively lower or lesser penetration index indicative of a lower proportional concentration of entities of the selected population within a given predictive attitudinal classification compared to the reference distribution. For example, a 15% distribution of the selected population for the predictive attitudinal classification of "Q", when compared to an 8% distribution for the reference population for this same "Q" predictive attitudinal classification, indicates a comparatively higher (or above average) penetration index or rate (a ratio of 1.875) of the selected population in this classification. Similarly, an 11% distribution of the selected population for the predictive attitudinal classification of "P", when compared to a 16% distribution for the reference population for this same "P" predictive attitudinal classification, indicates a comparatively lower (or below average) penetration index or rate (a ratio of 0.6875) of the selected population in this classification.

In addition, for each predictive attitudinal classification, the reference distribution may be normalized to a particular value, such as 100 or 1.0, e.g., a reference distribution of 11% in a first predictive attitudinal classification may be normalized to 100 and a reference distribution of 7% in a second predictive attitudinal classification may also be normalized to 100. Also for example, for the selected population, and for a given predictive attitudinal classification, a penetration index of 150 or 1.5 may be utilized to indicate that the selected population has proportionally (or percentage-wise) 50% (or 1.5 times) more individuals (households, living units or other groups) in that given predictive attitudinal classification compared to the larger reference population, such as a national or regional population. As illustrated above with the various percentage distributions for the "Q" and "R" predictive attitudinal classifications, these comparisons are performed on a proportional or percentage basis, rather than a comparison of pure or gross numbers, as the selected population generally concerns a considerably smaller total number of individuals (or groups) compared to the reference population represented in the database 100.

As a result of step 425, penetration indices or rates are determined for each predictive attitudinal classification of the plurality of predictive attitudinal classifications, comparing the proportion or distribution of the selected population in that classification to the proportion or distribution of the reference population in that classification. The plurality of predictive attitudinal classifications are then evaluated by their penetration indices and, depending upon the selected embodiment, are also evaluated based upon the relative (or proportional) reference and selected population sizes within each predictive attitudinal classification, step 430. Using the penetration indices and relative or comparative reference and selected population sizes of each predictive attitudinal classification, three additional levels of attitudinal classifications are determined, namely, core attitudinal classifications, niche attitudinal classifications, and growth attitudinal classifications (steps 435, 440, 445). While core determinations are usually determined first (to avoid potential confusion with niche determinations, as based upon proportions of the selected population in addition to penetration indices), the other determinations may be performed in any order. In other variations, depending upon the selected evaluation algorithm, other determination orders for core, niche and growth attitudinal classifications may be available.

More specifically, in step 435, one or more core attitudinal classifications are determined by selecting, from the plurality of predictive attitudinal classifications, at least one predictive attitudinal classification having a comparatively greater (e.g., average or above) penetration index and having a comparatively greater proportion of the selected population. These core attitudinal classifications represent predictive attitudinal classifications having the largest percentage of the selected population, such as customers, and corresponding, significant market share. With respect to a selected population of customers of a particular brand, the core attitudinal classifications represent significant brand appeal to population segments exhibiting corresponding behavioral characteristics.

In step 440, one or more niche attitudinal classifications are determined by selecting, from the plurality of predictive attitudinal classifications, at least one predictive attitudinal classification having a comparatively greater (e.g., average or above) penetration index and having a comparatively lesser proportion of the reference population. These niche attitudinal classifications represent predictive attitudinal classifications having a high penetration rate (and corresponding market share), but a relatively small percentage of the reference population, such as a small percentage of a prospect population.

In step 445, one or more growth attitudinal classifications are determined by selecting, from the plurality of predictive attitudinal classifications, at least one predictive attitudinal classification having a comparatively lesser (e.g., below average) penetration index and having a comparatively greater proportion of the reference population. These growth attitudinal classifications represent predictive attitudinal classifications having some penetration success, and with the comparatively large percentages of the reference population, such as prospective customers, indicate significant opportunities to increase penetration and add new customers from an otherwise underrepresented group.

To this point in the method of the present invention, considerable attitudinal and behavioral information has been provided, which may be utilized for a wide variety of purposes. Based on empirical modeling, actual attitudes and behaviors of segments of a selected population may be predicted, using the plurality of predictive attitudinal classifications. Depending upon selected purposes of the embodiment, additional information may be provided, such as the actual attitudes and behaviors of individuals or groups in the predictive attitudinal classifications, including the core, niche and growth classifications.

Additional information is also independently provided in accordance with the present invention. While a selected population has been predictively classified as exhibiting certain attitudes and behaviors, as "who" segments (such as who among the population are significant customers or prospects), an additional, independent and more fine-grained level of information is also provided, based upon the plurality of predictive message content classifications, providing independent "what" segments (such as what content will be most effective). More specifically, the actual members of the selected population, although assigned to a predictive attitudinal classification as a predominant classification, may also exhibit other or different attitudes and behaviors, represented by a probability or membership in one or more predictive message content classifications, in addition to those of the predominant predictive attitudinal classification. As consequence, in step 450, for each of the plurality of predictive attitudinal classifications, the method also independently determines one or more predictive message content classifications, based on the predictive message content classifications of the actual entities (individuals or groups) of the selected population assigned to that selected predictive attitudinal classification. For each predictive attitudinal classification, the plurality of predictive message content classifications may also be ranked, such as by comparative or relative penetration, proportion or distribution of a given predictive message content classification for that predictive attitudinal classification, step 455.

This independent determination of predictive message content classifications based upon the actual, selected population (step 450 and optional ranking step 455) within each predictive attitudinal classification, may be used to produce (or effectively results in) an information matrix or data structure, consisting of the plurality of predictive attitudinal classifications (e.g., as rows) and the plurality of predictive message content classifications (e.g., as columns), both of which may be further ranked or ordered according to relative distribution, penetration and/or population size. As a result, not only may a selected population be predictively classified or segmented attitudinally and behaviorally, using the plurality of predictive attitudinal classifications, they may also be independently and predictively classified based on content or theme receptivity, using the plurality of predictive message content classifications. Communication channel, media, timing, frequency, and sequencing information may also be included in such a matrix, e.g., as columns, and is discussed in greater detail below, as the various fields of a data structure of the present invention.

In the exemplary embodiments, with the availability of channel, media, timing, frequency, and sequencing information in the database 100, the method continues with step 460, in which the predominant communication channel and/or media preferences are determined for each predictive attitudinal classification of the plurality of predictive attitudinal classifications, based upon the preferred communication channels and/or preferred media types of the entities (individuals or groups) of the selected population assigned to the given predictive attitudinal classification, such as email, internet, direct mail, telecommunication, radio (broadcast, cable and satellite), television (network (broadcast), cable or satellite), video (or DVD) media, print media, electronic media, visual or other public display media, and depending upon the selected embodiment, the plurality of communication and media channel classifications may be more or less specific, such as further subdividing print and electronic media channels into newspaper, weekly magazines, monthly magazines, journals, business reports, and further into their print, internet, email or electronic versions. For example, predominant communication channels for a first predictive attitudinal classification may be, in preferred order, direct mail followed by radio followed by email, while predominant communication channels for a second predictive attitudinal classification may be, also in preferred order, television followed by telecommunication followed by direct mail.

In step 465, the predominant timing (time of day) preferences for communications are determined for each predictive attitudinal classification of the plurality of predictive attitudinal classifications, also based upon the communication timing preferences of the entities (individuals or groups) of the selected population assigned to the given predictive attitudinal classification. For example, predominant timing preferences for a first predictive attitudinal classification may be, in preferred order, weekends followed by evening, while predominant timing preferences for a second predictive attitudinal classification may be, also in preferred order, mornings followed by afternoons. The timing preferences may be further qualified based upon media and communication channels, such as predominant timing preferences being evenings for television, and weekends for telecommunications.

In step 470, optionally, the predominant frequency preferences for communications are determined for each predictive attitudinal classification of the plurality of predictive attitudinal classifications, also based upon the frequency of communication preferences of the entities (individuals or groups) of the selected population assigned to the given predictive attitudinal classification. For example, predominant frequency preferences for a first predictive attitudinal classification may be, in preferred order, monthly followed by semi-annually, while predominant timing preferences for a second predictive attitudinal classification may be, also in preferred order, weekly followed by bi-weekly. The predominant frequency of communications also may be further qualified based on either or both timing preferences and media and communication channels, such as no frequency preference (unlimited) for television communications, and zero frequency (no communication) for telecommunication channels (e.g., telephone call, faxes).

In step 475, optionally, the predominant sequencing preferences for communications are determined for each predictive attitudinal classification of the plurality of predictive attitudinal classifications, also based upon the sequencing of communication preferences of the entities (individuals or groups) of the selected population assigned to the given predictive attitudinal classification. This information may also be incorporated into the matrix discussed above and the data structure discussed below.

Lastly, this collection of information is output and, in the illustrated exemplary embodiment, also stored in a database, step 480. In the exemplary embodiment, as indicated, a matrix or data structure of information is provided in step 480, indicating the following:

(1) the plurality of predictive attitudinal classifications, ordered by core, niche and growth attitudinal classifications (and corresponding penetration indices);

(2) for each predictive attitudinal classification of the plurality of predictive attitudinal classifications, the predominant predictive message content classifications of the selected population assigned to that given predictive attitudinal classification;

(3) for each predictive attitudinal classification of the plurality of predictive attitudinal classifications, the predominant communication and/or media channel classifications of the selected population assigned to that given predictive attitudinal classification;

(4) for each predictive attitudinal classification of the plurality of predictive attitudinal classifications, the predominant communication timing classifications of the selected population assigned to that given predictive attitudinal classification;

(5) as an additional option in the exemplary embodiments, for each predictive attitudinal classification of the plurality of predictive attitudinal classifications, the predominant frequency of communication classifications of the selected population assigned to that given predictive attitudinal classification;

(6) as an additional option in the exemplary embodiments, for each predictive attitudinal classification of the plurality of predictive attitudinal classifications, the predominant sequencing of communication classifications of the selected population assigned to that given predictive attitudinal classification.

Following the output of information in step 480, the method may end, return step 485.

As indicated above, the system of the present invention generally comprises a memory storing a data repository (or database) 100 and a processor, such as a processor 115 included within a mainframe computer of system 110 or within either (or both) a database management server 140 or an application server 125 of system 150. The processor is programmed to perform the methodology of the present invention. As a consequence, the system and method of the present invention may be embodied as software which provides such programming.

More generally, the system, methods and programs of the present invention may be embodied in any number of forms, such as within any type of computer, within a workstation, within an application server such as application server 125, within a database management server 140, within a computer network, within an adaptive computing device, or within any other form of computing or other system used to create or contain source code. Such source code further may be compiled into some form of instructions or object code (including assembly language instructions or configuration information). The software or source code of the present invention may be embodied as any type of source code, such as SQL and its variations (e.g., SQL 99 or proprietary versions of SQL), C, C++, Java, or any other type of programming language which performs the functionality discussed above. As a consequence, a "construct" or "program construct", as used herein, means and refers to any programming language, of any kind, with any syntax or signatures, which provides or can be interpreted to provide the associated functionality or methodology (when instantiated or loaded into a server or other computing device).

The software or other code of the present invention, such as any resulting or compiled bit file (object code or configuration bit sequence), may be embodied within any tangible storage medium, such as within a memory or storage device for use by a computer, a workstation, any other machine-readable medium or form, or any other storage form or medium for use in a computing system. Such storage medium, memory or other storage devices may be any type of memory device, memory integrated circuit ("IC"), or memory portion of an integrated circuit (such as the resident memory within a processor IC), including without limitation RAM, FLASH, DRAM, SRAM, MRAM, FeRAM, ROM, EPROM or EPROM, or any other type of memory, storage medium, or data storage apparatus or circuit, depending upon the selected embodiment. For example, without limitation, a tangible medium storing computer readable software, or other machine-readable medium, may include a floppy disk, a CDROM, a CD-RW, a magnetic hard drive, an optical drive, a quantum computing storage medium or device, a transmitted electromagnetic signal (e.g., used in internet downloading), or any other type of data storage apparatus or medium.

The results, information and other data provided by the system, methods and programs of the present invention also may be embodied as a data structure and stored or provided in any number of forms and media, such as a data structure stored within any type of computer, within a workstation, within an application server such as application server 125, within a database management server 140, within a computer network, within a database 100, within an adaptive computing device, or within any form of memory, storage device, or machine-readable media, as discussed above. In accordance with the present invention, such a data structure is comprised of at least two fields of a plurality of fields, as follows.

A first field of the plurality of fields provides or stores information, such as codes or designations, pertaining to a first plurality of classifications which provide identification of persons according to a selected property. For example, the plurality of predictive attitudinal classifications identify persons (in either or both the reference population or the selected population), according to an attitudinal (selected) property. In other circumstances, this identification of "who" may be based on other selected properties, such as behavioral characteristics, demographic characteristics, geographic characteristics, financial characteristics, transactional characteristics, etc., such as identification of persons who engage in certain activities, who live in certain types of households, who live in a certain region or postal code area, who have incomes greater than a certain amount, who purchase particular goods of a particular monetary amount, and so on.

Optionally, depending upon the selected embodiment, additional fields related to this first field or which are subfields of this first field provide or store additional information pertaining to, for example, the percentage of the selected population or the reference population within each classification of the first plurality of classifications, or the corresponding penetration indices for each classification of the first plurality of classifications, or both, such as the corresponding penetration indices for the plurality of predictive attitudinal classifications. Other information in these additional fields or subfields may also specify a size of a prospect population, for marketing applications, for example.

Also optionally, depending on the selected embodiment, the first field may also include additional fields or subfields based on other relevant or related properties. For example, this first field may be further divided into categories such as core, niche and growth classifications, as discussed above.

A second field of the plurality of fields provides or stores information, such as codes or designations, pertaining to a second plurality of classifications, in which the second plurality of classifications provides information pertaining to a corresponding plurality of message versions, message content, or message themes. This second field providing a designation or code for the "what" of a communication will typically have one or two forms (or both), such as containing general information concerning types of messages, as in the plurality of predictive message content classifications described above, or containing more particular information, such as specific content versions correspondingly tailored to the plurality of predictive message content classifications. For an example of the latter case, this second field may include at least one designation or code for a particular version (of a plurality of content versions) for use in a direct mail to the entities identified in the first field (via the plurality of predictive attitudinal classifications), with other versions transmitted to other entities of the other classifications of the first plurality of classifications.

A third field of the plurality of fields provides or stores information, such as codes or designations, pertaining to a third plurality of classifications which provide media/channel information, such as the media and channel preferences which correspond to the preferences of the individuals identified in the first field. For example, this third field may include designations or codes (providing the "how" of a communication) corresponding to communication media (channels), such as for electronic mail, internet, direct mail, telecommunication, broadcast media (such as radio, television, cable, satellite), video media, optical media (DVD, CD), print media (newspaper, weekly magazines, monthly magazines, journals, business reports), electronic media (such as web sites and electronic forms of newspapers, magazines), and public display media (such as signage, billboards, multimedia displays).

A fourth field of the plurality of fields provides or stores information, such as codes or designations, pertaining to a fourth plurality of classifications which provide communication timing information. For example, this fourth field may include designations or codes (providing the "when" of a communication) corresponding to communication timing classifications such as morning, afternoon, evening, night, weekday, weekend, any time (no preference), and none.

A fifth field of the plurality of fields provides or stores information, such as codes or designations, pertaining to a fifth plurality of classifications which provide frequency of communication information. For example, this fifth field may include designations or codes corresponding to predictive communication frequency classifications, such as daily, weekly, biweekly, monthly, semi-monthly, bimonthly, annually, semi-annually, and none.

A sixth field of the plurality of fields provides or stores information, such as codes or designations, pertaining to a sixth plurality of classifications which provide communication sequencing information. For example, this fourth field may include designations or codes corresponding to particular sequences of communications, such as direct mail, followed by electronic media, followed by email. As indicated above, there are innumerable such combinations available.

A wide variety of selections of which fields are included in the data structure and the ordering of these various selected fields are available, as will be apparent to those of skill in the art, and are within the scope of the invention. In addition, this data structure embodiment may be housed, embodied, or stored in myriad orders and locations, such as different memory locations as directed by a DMA engine or memory address generator, for example. The data structure of the present invention may also be embodied, stored, distributed or communicated in a wide variety of forms, such as electronically (e.g., internet, wireless, email, storage disk), or through various print media, for example, such as in the form of a market research report.

In summary, the present invention provides a method, system and software for independently predicting a plurality of attitudinal classifications and a plurality of message content classifications, for a selected population of a plurality of entities (such as individuals or households) represented in a data repository. The method, system and software embodiments of the invention, in operation, each perform the following:

First, for each entity of the plurality of entities of the selected population, appending from the data repository a corresponding predictive attitudinal classification of a plurality of predictive attitudinal classifications and a corresponding plurality of predictive message content classifications, with the corresponding predictive attitudinal classification and corresponding plurality of predictive message content classifications having been determined using a plurality of predictive attitudinal models developed from a sample population and applied to a reference population represented in the data repository.

Second, for each predictive attitudinal classification of the plurality of predictive attitudinal classifications, determining a penetration index of the selected population compared to the reference population; and Third, for each predictive attitudinal classification of the plurality of predictive attitudinal classifications, independently determining at least one predominant predictive message content classification from the appended plurality of predictive message content classifications of the plurality of entities of the selected population having the corresponding predictive attitudinal classification of the plurality of predictive attitudinal classifications.

Typically, the independent determination of at least one predominant predictive message content classification comprises: for each predictive attitudinal classification, determining all of the appended plurality of predictive message content classifications of the plurality of entities of the selected population having the corresponding predictive attitudinal classification; and selecting one or more predictive message content classifications corresponding to a comparatively greater number of entities of the selected population.

In addition, depending upon the selected embodiment, for each entity of the plurality of entities of the selected population, the various embodiments provide for appending from the data repository at least one corresponding predictive communication media/channel classification of a plurality of predictive communication media classifications, with the corresponding predictive communication media classification having been determined from information stored in the data repository. For each predictive attitudinal classification of the plurality of predictive attitudinal classifications, the various embodiments provide for independently determining at least one predominant predictive communication media classification from the appended plurality of predictive communication media classifications of the plurality of entities of the selected population having the corresponding predictive attitudinal classification of the plurality of predictive attitudinal classifications. Typically, the plurality of predictive communication media classifications comprises at least two of the following communication media: electronic mail (email), direct mail, telecommunication, radio, television, video or DVD (digital versatile disk) media, print media, and visual or public display media. Depending upon the selected embodiment, the plurality of communication and media channel classifications may be more or less specific, such as further subdividing print and electronic media channels into newspaper, weekly magazines, monthly magazines, journals, business reports, and further into their print, internet, email or electronic versions, and such as further subdividing broadcast media such as radio and television into network, cable, satellite, etc.

Similarly, depending upon the selected embodiment, for each entity of the plurality of entities of the selected population, the various embodiments provide for appending from the data repository at least one corresponding predictive communication timing classification of a plurality of predictive communication timing classifications, the corresponding predictive communication timing classification having been determined from information stored in the data repository. For each predictive attitudinal classification of the plurality of predictive attitudinal classifications, the various embodiments provide for independently determining at least one predominant predictive communication timing classification from the appended plurality of predictive communication timing classifications of the plurality of entities of the selected population having the corresponding predictive attitudinal classification of the plurality of predictive attitudinal classifications. Also typically, the plurality of predictive communication timing classifications comprises at least two of the following communication timing classifications: any time, morning, afternoon, evening, night, weekday, and weekend.

Also similarly, depending upon the selected embodiment, for each entity of the plurality of entities of the selected population, the various embodiments provide for appending from the data repository at least one corresponding predictive communication frequency classification of a plurality of predictive communication frequency classifications, the corresponding predictive communication frequency classification having been determined from information stored in the data repository. For each predictive attitudinal classification of the plurality of predictive attitudinal classifications, the various embodiments provide for independently determining at least one predominant predictive communication frequency classification from the appended plurality of predictive communication frequency classifications of the plurality of entities of the selected population having the corresponding predictive attitudinal classification of the plurality of predictive attitudinal classifications. The plurality of predictive communication frequency classifications typically comprises at least two of the following frequency classifications: daily, weekly, biweekly, monthly, semi-monthly, bimonthly, annually, semi-annually, unlimited, and none.

Also similarly, depending upon the selected embodiment, for each entity of the plurality of entities of the selected population, the various embodiments provide for appending from the data repository at least one corresponding predictive communication sequencing classification of a plurality of predictive communication sequencing classifications, the corresponding predictive communication sequencing classification having been determined from information stored in the data repository. For each predictive attitudinal classification of the plurality of predictive attitudinal classifications, the various embodiments provide for independently determining at least one predominant predictive communication sequencing classification from the appended plurality of predictive communication sequencing classifications of the plurality of entities of the selected population having the corresponding predictive attitudinal classification of the plurality of predictive attitudinal classifications.

As part of the present invention, the various embodiments provide for determining the selected population of the plurality of entities by matching a listing of a plurality of customers to the reference population represented in the data repository. Alternatively, non-matching entities of the selected population may simply be considered eliminated from the processes involving the selected population. Exclusion of entities of the selected population from these processes may also be dependent upon a level or degree of match to the entities of the data repository 100, such as matching to an individual, a household, or merely a geographic or postal code area.

Also in summary, in the various embodiments, the plurality of predictive message content classifications are determined by: developing a plurality of empirical attitudinal factors based on a factor analysis of an attitudinal survey of the sample population; using each empirical attitudinal factor of the plurality of empirical attitudinal factors, scoring each participant of the attitudinal survey to create a corresponding plurality of empirical attitudinal factor scores; using a plurality of selected variables from the data repository as independent variables, and using the corresponding plurality of empirical attitudinal factor scores as dependent variables, performing a regression analysis to create the plurality of predictive attitudinal models; and using each predictive attitudinal model of the plurality of predictive attitudinal models, scoring the plurality of entities represented in the data repository, as the reference population, to create the plurality of predictive message content classifications. The plurality of predictive attitudinal classifications are determined by a cluster analysis of the plurality of predictive message content classifications of each entity of the plurality of entities represented in the data repository.

The invention also provides for determining core, niche and growth attitudinal classifications, as follows: determining one or more core attitudinal classifications by selecting, from the plurality of predictive attitudinal classifications, at least one predictive attitudinal classification having a comparatively greater (e.g., average or above average) penetration index and having a comparatively greater proportion of the selected population; determining one or more niche attitudinal classifications by selecting, from the plurality of predictive attitudinal classifications, at least one predictive attitudinal classification having a comparatively greater penetration index and having a comparatively lesser proportion of the reference population; and determining one or more growth attitudinal classifications by selecting, from the plurality of predictive attitudinal classifications, at least one predictive attitudinal classification having a comparatively lesser (e.g., below average) penetration index and having a comparatively greater proportion of the reference population.

Numerous advantages of the present invention are readily apparent. The embodiments of the present invention provide a predictive methodology, system and software, for accurate prediction of attitudes, motivations and behaviors, which may be utilized for marketing, research, assessment, and other applications. The embodiments of the invention are empirically-based upon actual attitudinal research and other information from a population sample, and provide accurate modeling to predict and extrapolate such attitudinal information to a larger reference population. In addition to identifying to "whom" a communication should be directed, the embodiments of the invention further provide information concerning the "what" of the communication, such as the preferred message themes or message content, independently from any population grouping, segmentation or clustering process. In addition, the embodiments of the invention provide actionable results, providing not only audience attitudinal information and preferred message content, but also preferred communication channel or media information, communication frequency, communication timing information, and communication sequencing information.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

It is claimed:

1. A predictive marketing message system, comprising:
one or more hardware computer processors; and
one or more storage devices configured to store software instructions executable by the one or more hardware computer processors to cause a classification system to:
receive, from a requesting computing system, a request for predictive marking information;
access information in entity files associated with entities;
identify a set of entities having similarities in the accessed information based on attitudinal and/or behavioral actions indicators of predetermined attitudinal and/or behavioral actions models, wherein the attitudinal and/or behavioral actions indicators include at least one of:
lifestyle information,
an interest,
demographic information, behavioral/transactional/action information, or socioeconomic information, or cultural information;

append the attitudinal and/or behavioral actions indicators to the entity files associated with the identified set of entities;

determine a message theme associated with the appended attitudinal and/or behavioral actions indicators, the message theme indicative of message content responsiveness, wherein the message theme includes at least one of:
brand loyalty,
impulse purchasing behavior,
incentive driven behavior,
patriotic behavior,
environmentally conscious behavior,
trend following behavior,
product research tendencies,
product preferences,
recreational shoppers,
quality brand preferences,
mainstream adopters of trends,
novelty seekers, or
price conscious behavior;

determine a message media channel associated with the appended attitudinal and/or behavioral actions indicators, the message media channel indicative of a preferred medium of communication, wherein the message media channel includes at least one of:
electronic mail,
internet,
digital display,
digital video,
an electronic notification,
direct mail,
telecommunication,
broadcast media,
video media,
optical media,
print media,
electronic media,
digital or satellite radio,
traditional terrestrial broadcasting,
newspaper,
digital newspapers,
television, or
public display media; and automatically generate and transmit to the requesting computing system predictive marketing information indicating at least the message theme and the message media channel.

2. The predictive marketing message system of claim 1, wherein the one or more hardware computer processors cause the classification system to further:
determine a behavioral classification associated with the appended attitudinal and/or behavioral actions indicators, wherein the behavioral classification includes a behavior for at least one of: a previous transaction, a previous purchase, or a previous activity.

3. The predictive marketing message system of claim 1, wherein automatically generating the predictive marketing information is further based on a purchase channel preference that includes purchase or conversion through at least one of: a retail store with cutting edge products; a retail store with certain brands; a retail store with competitive prices; a catalog; an upscale retail store; a mid-level retail store; a link to a coupon; or discount offer.

4. The predictive marketing message system of claim 1, wherein automatically generating the predictive marketing information further includes:
accessing a message timing associated with the appended attitudinal and/or behavioral actions indicators, wherein the message timing includes at least one of: a time of day, morning, afternoon, evening, week day, weekend, or triggered based on an occurrence of a particular event, wherein automatically generating the predictive marketing information is further based on the message timing.

5. The predictive marketing message system of claim 1, wherein automatically generating the predictive marketing information further includes:
accessing a message frequency associated with the appended attitudinal and/or behavioral actions indicators, wherein the message frequency includes at least one of: hourly, daily, weekly, bi-weekly, monthly, semi-monthly, annually, or semi-annually, wherein automatically generating the predictive marketing information is further based on the message frequency.

6. The predictive marketing message system of claim 1, wherein determining the message theme associated with the appended attitudinal and/or behavioral actions indicators includes:
scoring individual message themes of a plurality of message themes based on the appended attitudinal and/or behavioral actions indicators; and
selecting a message theme of a plurality of message themes based on the scores.

7. The predictive marketing message system of claim 1, wherein accessing the message media channel associated with the appended attitudinal and/or behavioral actions indicators includes:
scoring individual message media channels of a plurality of message media channels based on the appended attitudinal and/or behavioral actions indicators; and
selecting a message media channel of a plurality of message media channels based on the scores.

8. The predictive marketing message system of claim 1, wherein the accessed information in entity files associated with entities comprises survey data and/or behavioral actions data including transactions, online actions, offline actions.

9. The predictive marketing message system of claim 1, wherein the one or more hardware computer processors include a remote processor.

10. The predictive marketing message system of claim 1, wherein the entity files include files associated with at least one of: an individual, a household, a living unit, or a group of people.

* * * * *